US012439180B2

(12) United States Patent
Kandori et al.

(10) Patent No.: US 12,439,180 B2
(45) Date of Patent: Oct. 7, 2025

(54) IMAGING ELEMENT, IMAGING DEVICE, MONITORING DEVICE, AND METHOD FOR CONTROLLING IMAGING ELEMENT

(71) Applicant: CANON KABUSHIKI KAISHA, Tokyo (JP)

(72) Inventors: Atsushi Kandori, Kanagawa (JP); Tomoya Onishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 18/406,383

(22) Filed: Jan. 8, 2024

(65) Prior Publication Data
US 2024/0147094 A1 May 2, 2024

Related U.S. Application Data

(63) Continuation of application No. PCT/JP2021/025858, filed on Jul. 8, 2021.

(51) Int. Cl.
*H04N 25/71* (2023.01)
*H04N 25/445* (2023.01)
*H04N 25/62* (2023.01)
*H04N 25/77* (2023.01)

(52) U.S. Cl.
CPC ......... *H04N 25/745* (2023.01); *H04N 25/445* (2023.01); *H04N 25/62* (2023.01); *H04N 25/77* (2023.01)

(58) Field of Classification Search
CPC .... H04N 25/745; H04N 25/445; H04N 25/62; H04N 25/77; H04N 25/42; H04N 25/707; H04N 25/533; H04N 25/531; H04N 25/532
See application file for complete search history.

(56) References Cited

U.S. PATENT DOCUMENTS

| | | | |
|---|---|---|---|
| 9,142,575 B2 | 9/2015 | Kobayashi |
| 9,894,308 B2 | 2/2018 | Onishi |
| 9,900,532 B2 | 2/2018 | Takado |
| 9,924,121 B2 | 3/2018 | Onishi |
| 10,122,951 B2 | 11/2018 | Takado |
| 10,356,286 B2 | 7/2019 | Ito |

(Continued)

FOREIGN PATENT DOCUMENTS

| | | |
|---|---|---|
| EP | 3493529 A1 | 6/2019 |
| JP | 2020-174254 A | 10/2020 |

(Continued)

*Primary Examiner* — Shahbaz Nazrul
(74) *Attorney, Agent, or Firm* — Venable LLP

(57) ABSTRACT

An imaging element having a plurality of pixels, wherein the plurality of pixels have stored charge reset periodically, at least in some of the plurality of pixels, first readout processing in which stored charge by first exposure is read out is performed, first signal processing based on a first pixel signal read out by the first readout processing is performed, whether to perform second readout processing in which stored charge by second exposure is read out and second signal processing based on a second pixel signal read out by the second readout processing is determined, in response to a result of the first signal processing, and the first readout processing, the first signal processing, and the second readout processing are performed within one cycle of reset which is performed periodically.

22 Claims, 19 Drawing Sheets

(56) References Cited

U.S. PATENT DOCUMENTS

| | | |
|---|---|---|
| 10,382,714 B2 | 8/2019 | Michimata |
| 10,419,702 B2 | 9/2019 | Onishi |
| 10,791,251 B2 | 9/2020 | Ito |
| 11,189,649 B2 | 11/2021 | Iwakura |
| 11,381,788 B2 | 7/2022 | Onishi |
| 11,553,151 B2 | 1/2023 | Hizu |
| 11,778,153 B2 | 10/2023 | Ito |
| 2012/0044394 A1* | 2/2012 | Komiya ............... H04N 25/445 348/E9.003 |
| 2015/0285625 A1* | 10/2015 | Deane ................. G01S 7/4816 348/140 |
| 2017/0195596 A1* | 7/2017 | Vogelsang ........... H04N 25/778 |
| 2025/0142226 A1* | 5/2025 | De Wit ................ H04N 25/589 |

FOREIGN PATENT DOCUMENTS

| | | |
|---|---|---|
| WO | 2018/021034 A1 | 2/2018 |
| WO | 2020/066433 A1 | 4/2020 |

\* cited by examiner

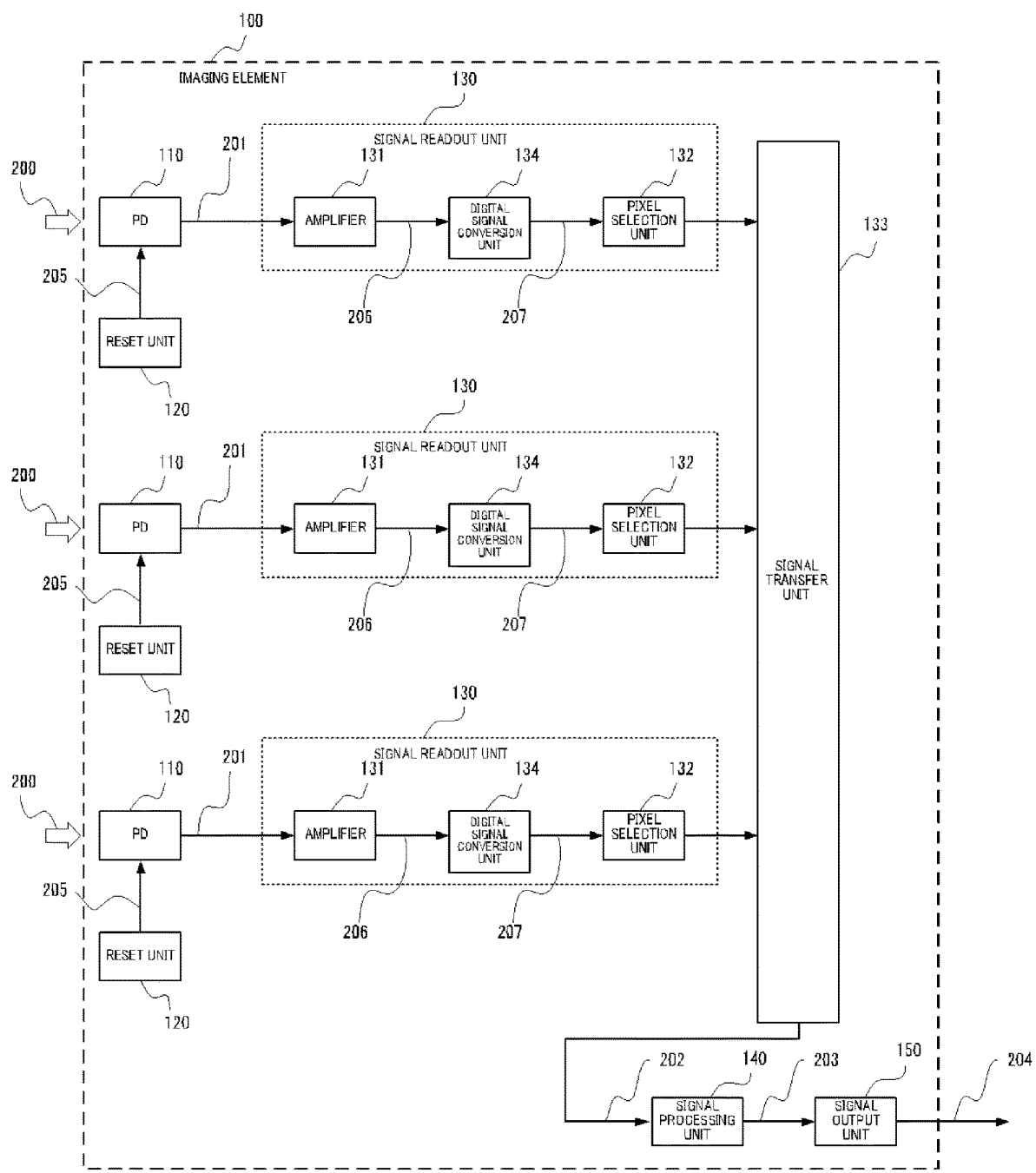

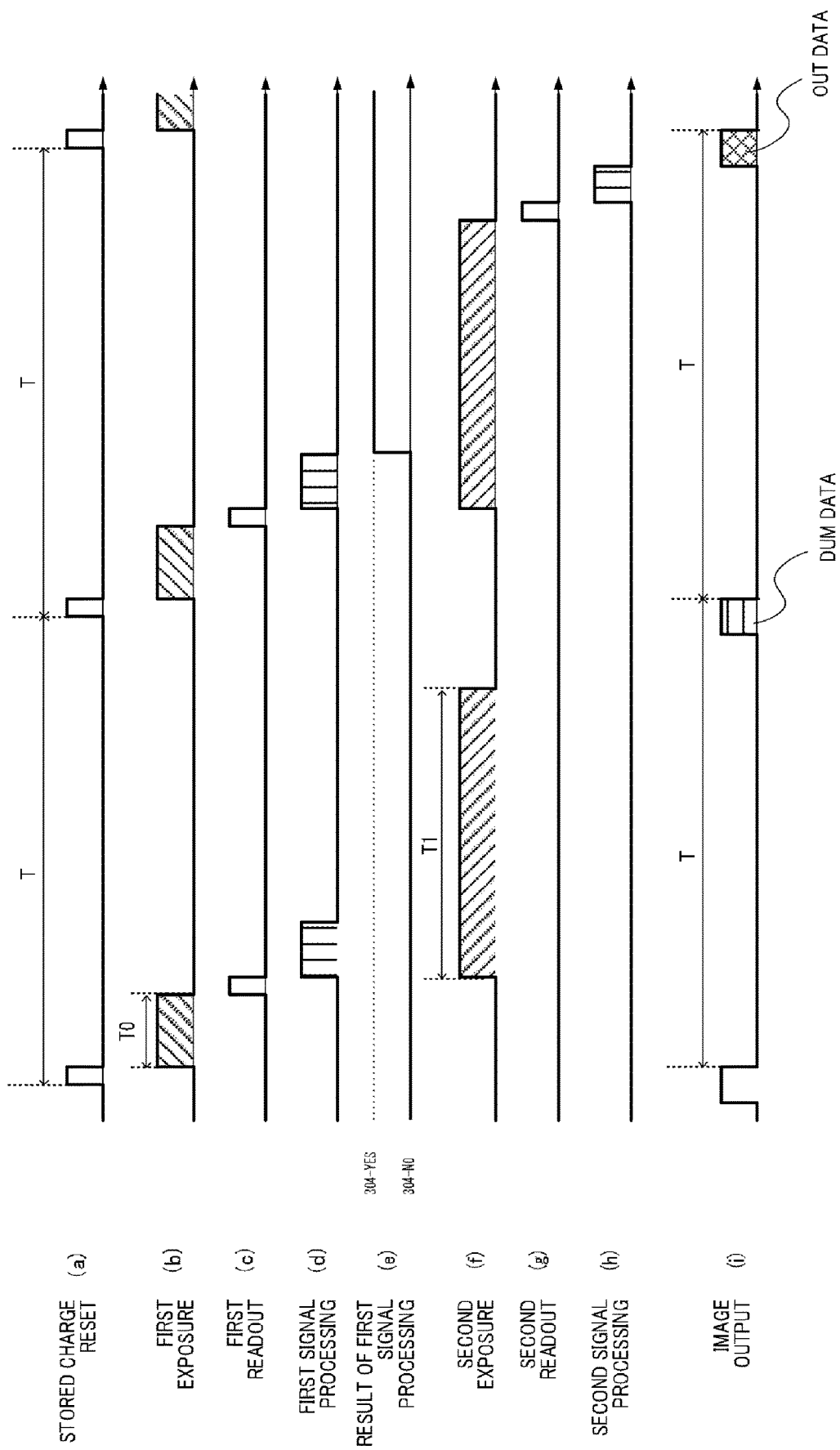

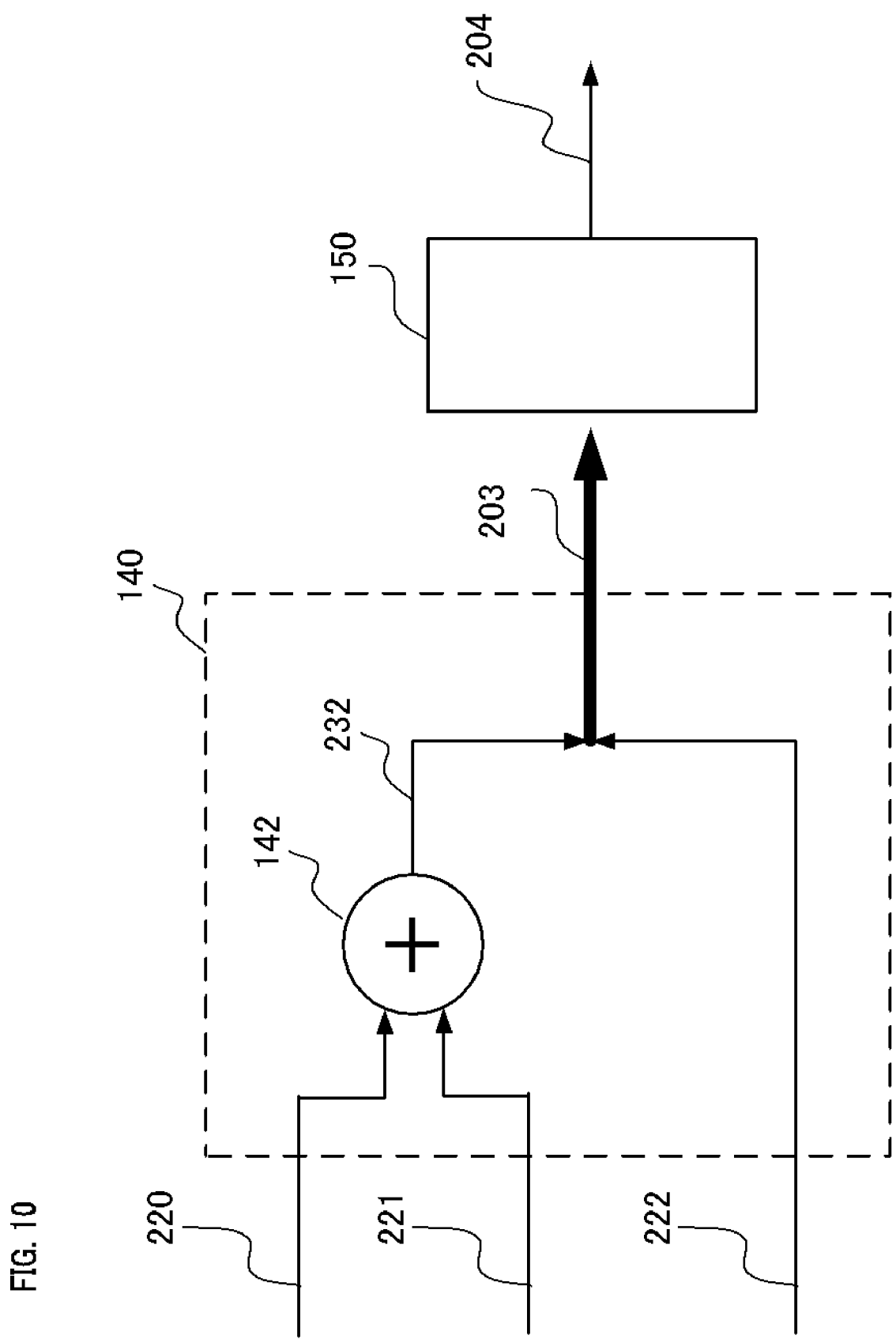

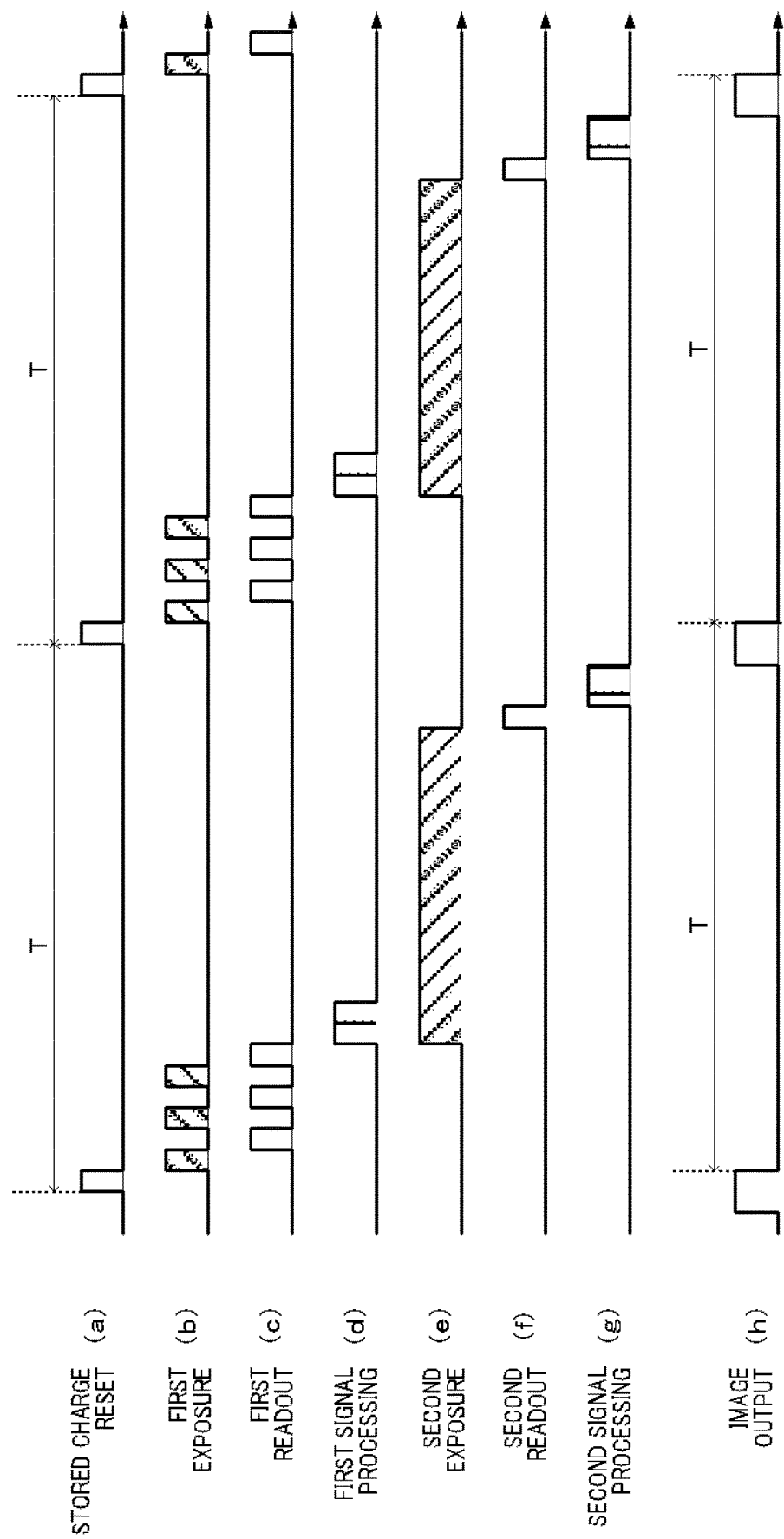

//mentions>
IMAGING ELEMENT, IMAGING DEVICE, MONITORING DEVICE, AND METHOD FOR CONTROLLING IMAGING ELEMENT

CROSS-REFERENCE TO RELATED APPLICATIONS

This application is a Continuation of International Patent Application No. PCT/JP2021/025858, filed on Jul. 8, 2021, which is hereby incorporated by reference herein in its entirety.

BACKGROUND OF THE INVENTION

Field of the Invention

The present invention relates to an imaging element, an imaging device, a monitoring device, and a method for controlling the imaging element.

Description of the Related Art

An imaging device that detects a moving subject in an image captured by an imaging element and changes the operation of the imaging element has been proposed. WO 2018/021034 proposes an imaging device that changes operation settings for the imaging element on the basis of whether there is a moving subject in the image. The imaging device disclosed in WO 2018/021034 has a frame memory that stores captured pixel signals in a time series and compares images stored in the frame memory and has a status determination unit determine the operation state of the pixels on the basis of whether there is a moving subject in the image. The imaging device determines the operation of an image sensor during image acquiring in the next and subsequent frames on the basis of whether there is a moving subject in the image.

The imaging device disclosed in WO 2018/021034 is provided with a large-capacity frame memory to store a plurality of images obtained from the imaging element in order to detect a moving subject. Therefore, the cost increases due to the additional large-capacity frame memory and the power consumption increases. In addition, the responsiveness to images is hardly improved because image determination is performed only each time one image is obtained from the imaging element.

SUMMARY OF THE INVENTION

In view of the foregoing, it is an object of the present disclosure to provide an imaging device capable of acquiring images simply and quickly upon the occurrence of an event.

The first aspect of the present disclosure is an imaging element having a plurality of pixels, wherein the plurality of pixels have stored charge reset periodically, at least in some of the plurality of pixels, first readout processing in which stored charge by first exposure is read out is performed, first signal processing based on a first pixel signal read out by the first readout processing is performed, whether to perform second readout processing in which stored charge by second exposure is read out and second signal processing based on a second pixel signal read out by the second readout processing is determined, in response to a result of the first signal processing, and the first readout processing, the first signal processing, and the second readout processing are performed within one cycle of reset which is performed periodically.

The second aspect of the present disclosure is a method for controlling an imaging element comprising a plurality of pixels each including a photoelectric conversion unit, a readout unit configured to read out charge stored in the photoelectric conversion unit, a reset unit configured to reset the photoelectric conversion unit, and a signal processing unit configured to perform signal processing on a pixel signal each output from the plurality of the pixels, the method comprising the steps of: resetting the photoelectric conversion unit periodically in the plurality of pixels; performing first readout processing in which charge stored by first exposure is read out; performing first signal processing on the basis of a first pixel signal read out by the first readout processing; determining, in response to a result of the first signal processing, whether to perform second readout processing in which charge stored by second exposure is read out and second signal processing based on a second pixel signal read out by the second readout processing, wherein the first readout processing, the first signal processing, and the second readout processing are performed within one cycle of reset performed periodically.

According to the present disclosure, images upon the occurrence of an event can be acquired simply and quickly.

Further features of the present invention will become apparent from the following description of exemplary embodiments with reference to the attached drawings.

BRIEF DESCRIPTION OF THE DRAWINGS

FIGS. 1A to 1E are schematic diagrams of a configuration of an imaging element according to an embodiment of the disclosure;

FIG. 3 is a chart for illustrating the timing of processing by the imaging element according to the embodiment;

FIG. 10 is a schematic diagram for illustrating an imaging element according to a sixth embodiment;

FIG. 11 is a chart for illustrating an imaging element according to a seventh embodiment;

DESCRIPTION OF THE EMBODIMENTS

Hereinafter, embodiments of the present disclosure will be described with reference to the drawings. Note however that the present disclosure is not limited by these embodiments and can be modified and changed in various manners within the gist thereof.

First Embodiment

Figure 1A:
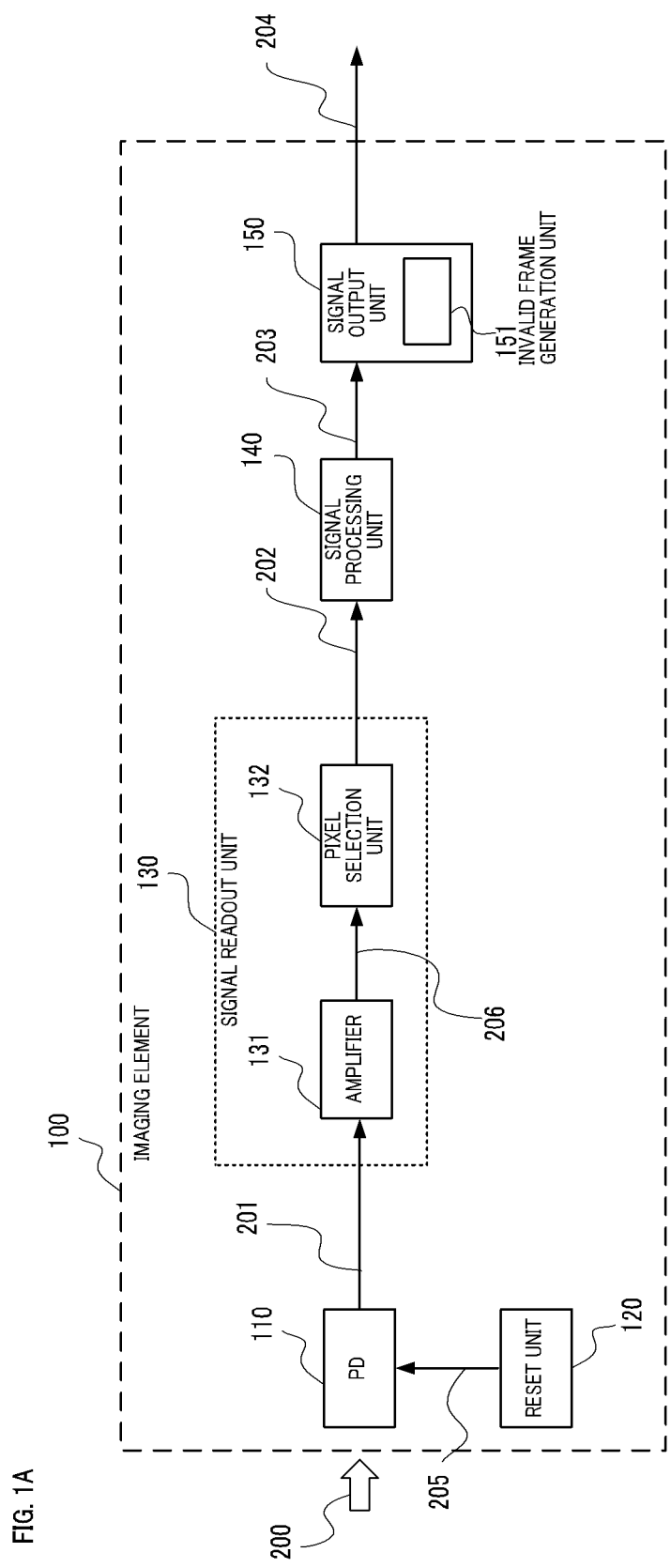

FIG. 1A is a schematic diagram of an imaging element 100 included in an imaging device according to an embodiment of the disclosure. The imaging element 100 includes a photoelectric conversion unit 110, a reset unit 120, a signal readout unit 130, a signal processing unit 140, and a signal output unit 150. The signal readout unit 130 has an amplifier 131 and a pixel selection unit 132. FIG. 1A shows an incident light 200, a charge signal 201, a light detection signal 202, a signal processed pixel output 203, an image output signal 204, and a photodiode charge reset signal 205.

According to the embodiment, periodic charge reset processing for the photoelectric conversion unit 110 is performed. During one cycle, the signal processing unit 140 performs first readout processing in which stored charge by first exposure is read out and first signal processing based on a first pixel signal read out by the first readout processing. The signal processing unit 140 also determines whether to perform second readout processing in which stored charge by second exposure is read out and second signal processing based on a second pixel signal read out by the second the readout processing, in response to the result of the first signal processing. The first readout processing, the first signal processing, the second readout processing and the second signal processing are performed within one cycle of the periodic reset processing.

In FIG. 1A, the photoelectric conversion unit 110 may include a photodiode. The photodiode can generate charge on the basis of the intensity and time of received light and store the charge. Herein, the light receiving unit of a photodiode is referred to as a pixel. One pixel includes a photoelectric conversion unit 110, a signal readout unit 130 that reads out charge stored in the photoelectric conversion unit 110, and a reset unit 120 that resets the photoelectric conversion unit 110. The imaging element 100 has a plurality of pixels in a first or second dimensional arrangement. Charge generated by the photoelectric conversion unit (photodiode) 110 is converted into a voltage signal in the signal readout unit 130 and output to the signal processing unit 140.

The signal readout units 130 each include an amplifier 131 that converts charge into voltage for the pixel. An output from the amplifier 131 of each pixel is connected to and output from the pixel selection unit 132. The signal readout unit 130 is driven in response to a control signal from a control circuit (not shown).

The signal processing unit 140 performs signal processing on pixel signals output from a plurality of pixels. The signal processing unit 140 has two functions, the first function is to detect an occurrence of an event on the basis of signals from the pixels (first signal processing function), and the second function is to correct the signals received from the pixels and to output the signals to the signal output unit 150 (second signal processing function). The detailed operation of the signal processing unit 140 will be described with reference to FIGS. 2 and 3.

The signal output unit 150 collectively outputs signals from all pixels received from the signal processing unit 140 to the outside. Herein, the output signal including the information of all the pixels is referred to as an image signal, and a set of image signals is referred to as a frame. The image signal is used to modify, display, or record one frame of a captured image outside the imaging element 100. Generally, in the process, the signal positions are rearranged, and brightness and color adjustments are made outside the imaging element 100.

The signal output unit 150 outputs an image output signal for each frame repeatedly, normally at a constant frequency fout (=1/period T). This frequency fout is called the frame rate which is an indicator of how many sets of frame images are output per second. The unit of the frame rate is fps (frames per second). The specific value of the frame rate depends on the number of pixels in the imaging element, but generally ranges from several fps to several hundred fps.

The charge stored in the photoelectric conversion unit 110 is read by the signal readout unit 130, but if the stored charge is not surely removed after reading, some unwanted signals may be mixed into the image signal, which may degrade the quality (image quality) of the image signal for the next readout. Therefore, the reset unit 120 is used to remove the charge of the photoelectric conversion unit 110 (resetting the charge of the photoelectric conversion unit 110). This processing of resetting the charge of the photoelectric conversion unit 110 is desirably performed at all pixels in a frame cycle before storing charge in the pixels in order to prevent degradation of the image quality.

Figure 1B:
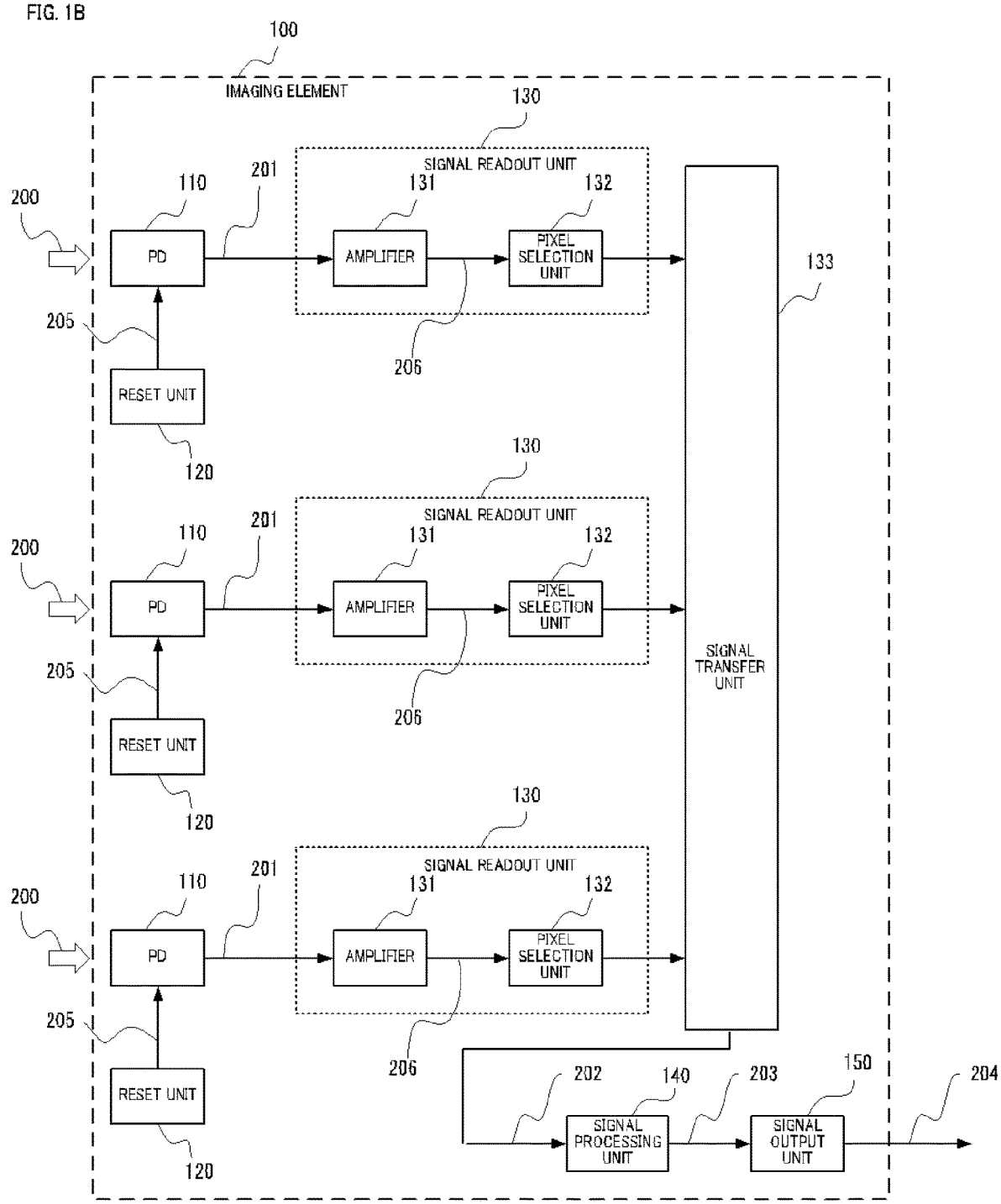

Although in FIG. 1A, the imaging element 100 has only one pixel for the sake of simplicity of illustration, the imaging element 100 may include a plurality of pixels and a plurality of signal transfer units 133 for transferring light detection signals from the plurality of pixels, as shown in FIG. 1B. The signal transfer unit 133 is configured to read out and transfer a light detection signal, and a transfer method in a CMOS sensor is used. Specifically, a plurality of pixels are arranged two-dimensionally in the imaging element 100, and in the row (horizontal) direction, the signal transfer unit 133 is arranged for each pixel, and in the column (vertical) direction, the signal transfer unit 133 is used commonly by the pixel selection units 132. The signal transfer unit 133 is connected to the signal processing unit 140, and an output signal from a pixel selected by the pixel selection unit 132 is transferred to the signal processing unit 140 via the signal transfer unit 133. A plurality of pixels are sequentially selected in a time series, so that signals from the plurality of pixels can be sequentially extracted using the common signal transfer unit 133.

Figure 4A:
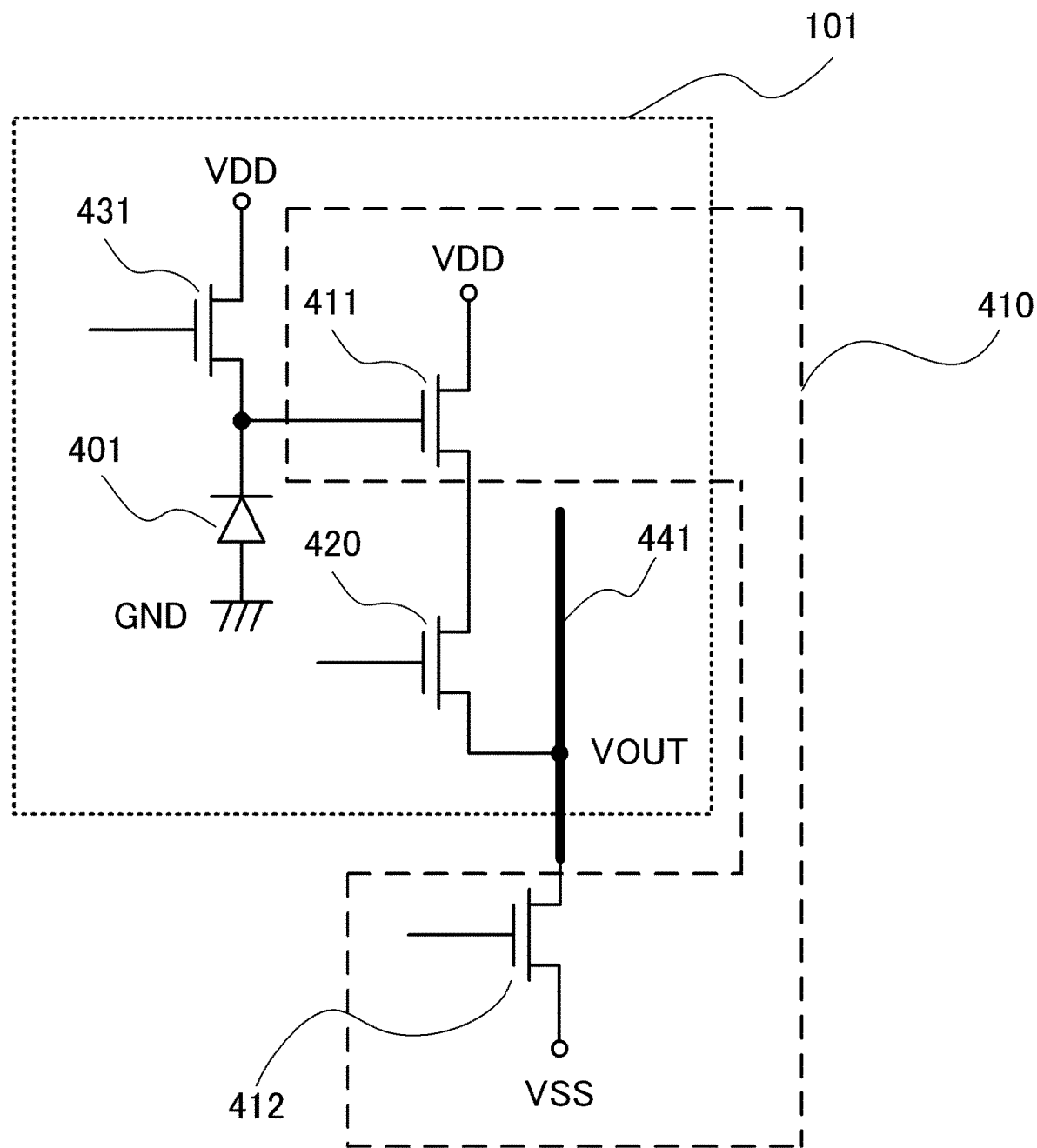
FIGS. 4A to 4D are schematic diagrams for illustrating the imaging element according to the embodiment in more detail.
Figure 4B:
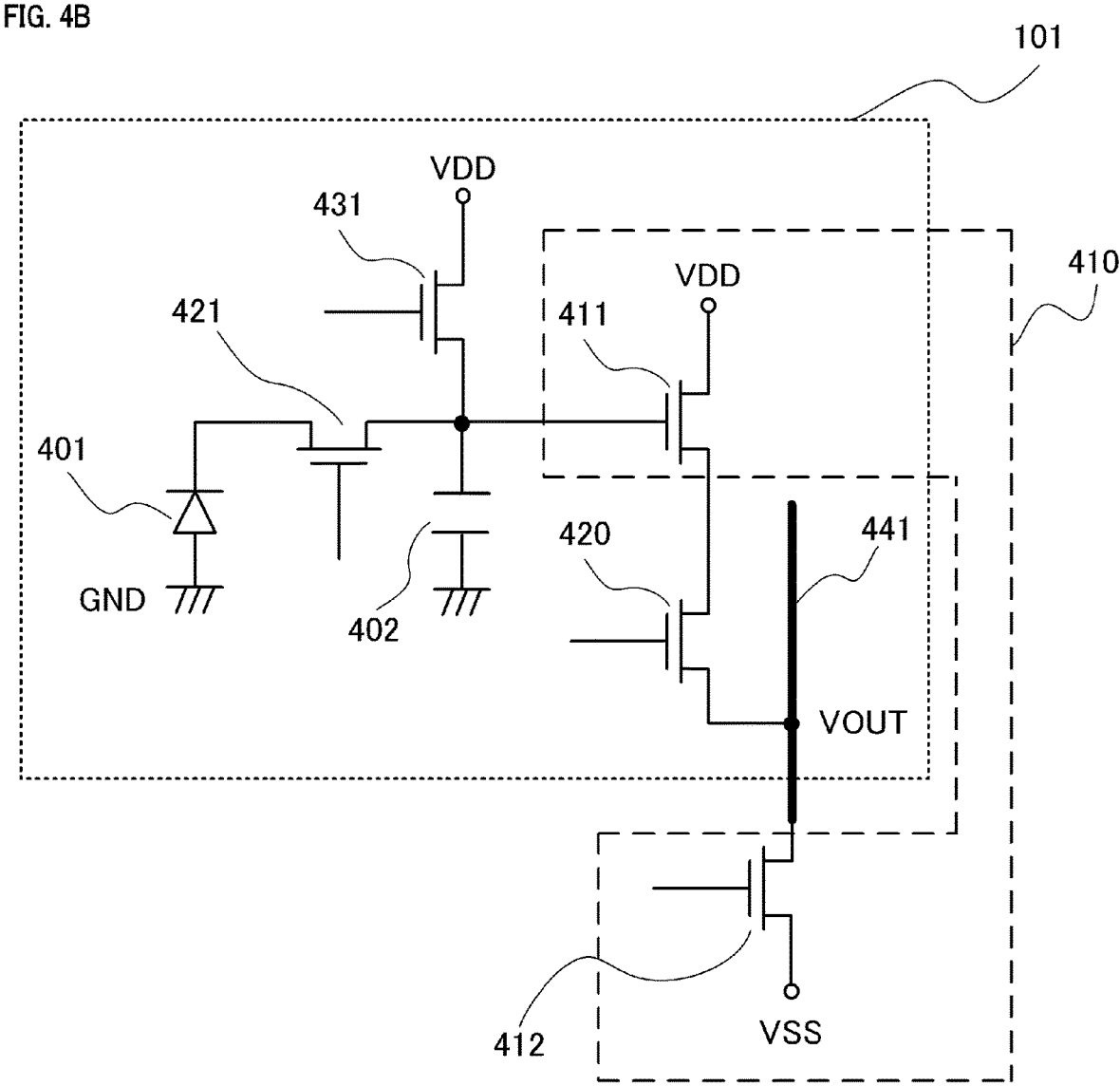
Figure 4C:
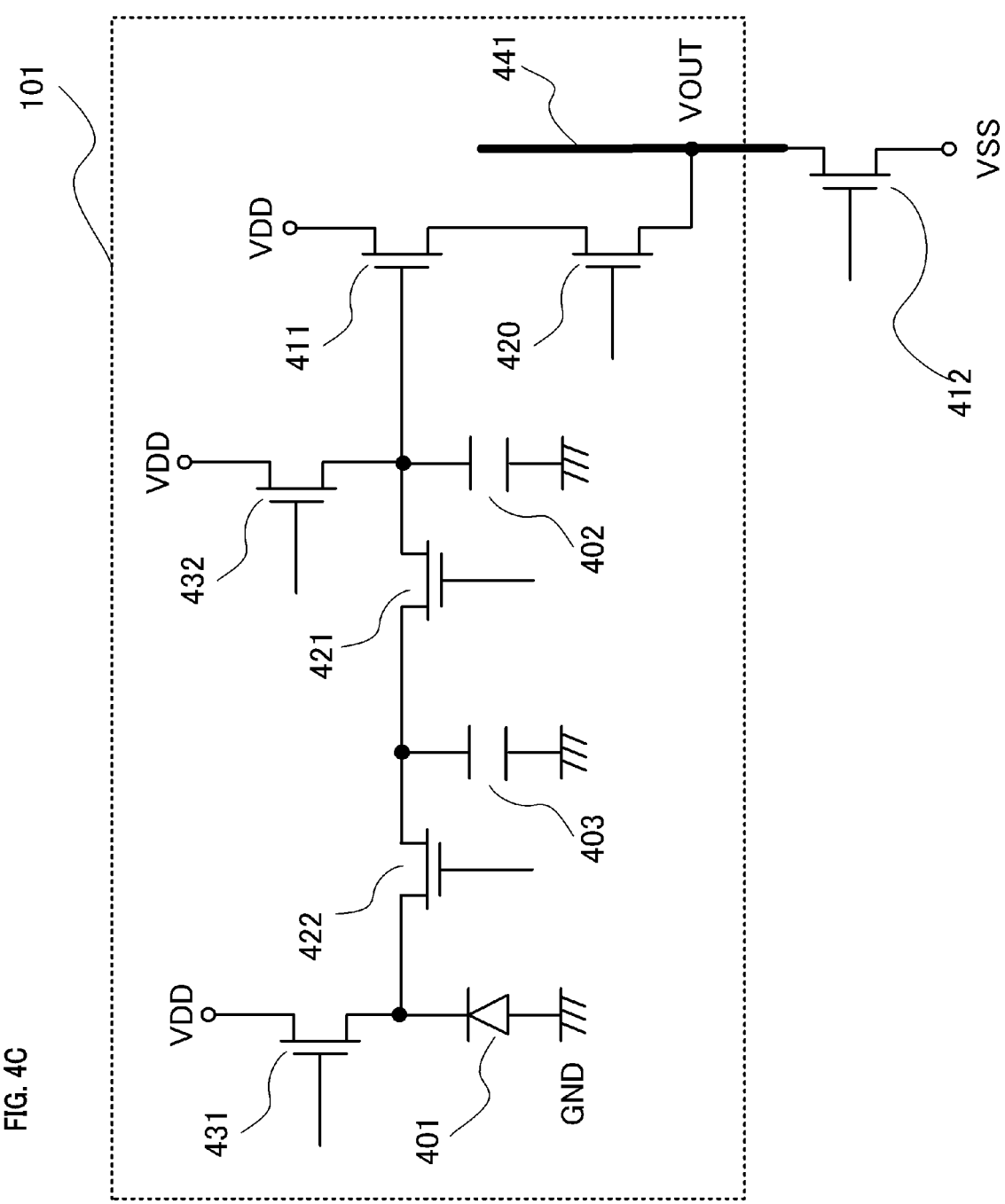
Figure 4D:
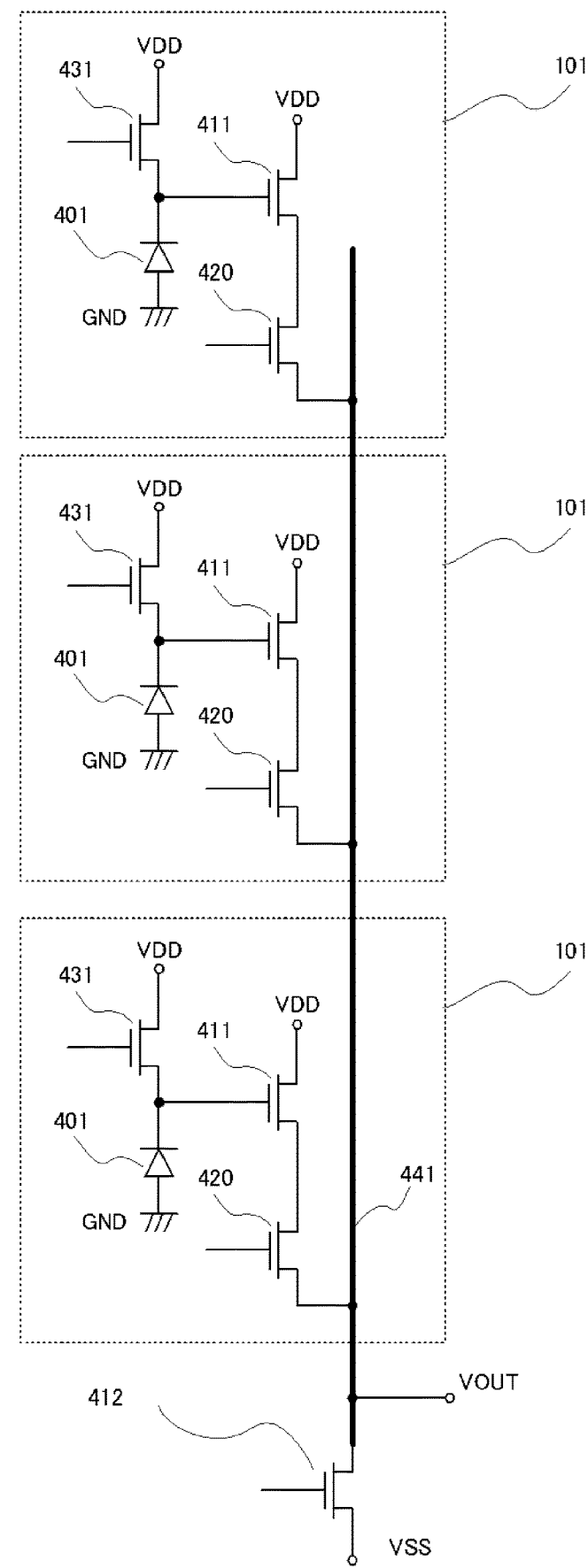

With reference to FIGS. 4A and 4D, a specific exemplary configuration of the photoelectric conversion unit 110 and the signal readout unit 130 will be described. FIG. 4A shows only one pixel 101 for the sake of simplicity, but in reality, as shown in FIG. 4D, a plurality of pixels 101 are provided for one transfer signal line 441. FIG. 4D shows the configuration of one row of pixels, and the imaging element 100 has the configuration shown in FIG. 4D for multiple rows. All transistors described herein are MOS transistors.

In FIG. 4A, a photodiode 401 is used as the photoelectric conversion unit 110 and has its cathode terminal connected to GND. As the reset unit 120, a reset transistor 431 is arranged between a positive power supply VDD and the photodiode 401. As a charge-to-voltage conversion amplifier 131, a drive transistor 411 and a load transistor 412 are arranged in series between a positive power supply VDD and a negative power supply VSS. The photodiode 401 is connected to the gate input GATE of the drive transistor 411. The positive power supply VDD, the drive transistor 411, the load transistor 412, and the negative power supply VSS constitute a source follower amplifier 410. The source follower amplifier 410 has a high input impedance and a low output impedance and serves as a buffer amplifier that converts charge stored in an input side element into voltage and transfers the voltage to the succeeding stage circuit.

A selection transistor 420 is used as the pixel selection unit 132 and is provided between the drive transistor 411 and the load transistor 412. By turning on the selection transistor 420, the source follower amplifier between the positive power supply VDD and the negative power supply VSS operates to generate VOUT. The signal transfer unit 133 is a transfer signal line 441, which is connected to the VOUT terminal of the source follower amplifier. As shown in FIG. 4D, the VOUT terminals of the 101 pixels that share the signal transfer unit 133 are all connected to the same transfer signal line 441. For a plurality of pixels connected to the same transfer signal line 441, only the selection transistor 420 of one of the pixels is selected at the same time. By sequentially switching the transistor to be selected, all the outputs from the pixels can be read out in a time series. The load transistor 412 of the source follower amplifier does not need to be provided in each pixel, but one such amplifier needs only be provided for one transfer signal line 441. The imaging element may have a plurality of pixel rows and transfer signal lines 441 shown in FIG. 4D.

The reset unit 120 includes a reset transistor 431 arranged between the positive power supply VDD and the photodiode 401. By turning on the reset transistor 431 before starting exposure, the charge stored in the photodiode 401 can be removed.

Another exemplary configuration of the photoelectric conversion unit 110 and the signal readout unit 130 will be described with reference to FIG. 4B. In the configuration shown in FIG. 4B, a diffusion capacitance FD 402 and an FD transfer transistor 421 are added to the configuration illustrated in FIG. 4A. The diffusion capacitance FD 402 is arranged between the gate input GATE of the drive transistor 411 and the GND terminal. Furthermore, the selection transistor 420 is inserted in the wiring portion between the cathode terminal of the photodiode 401 and the gate input GATE of the drive transistor 411. In FIG. 4B, the FD transfer transistor 421 is normally turned off during exposure and is turned on at the end of exposure to transfer charge stored in the photodiode 401 to the diffusion capacitance FD 402, which can then be converted into a voltage signal by the drive transistor 411.

In FIG. 4B, the reset transistor 431 is arranged between the positive power supply VDD and the gate input GATE of the drive transistor 411, unlike the position in FIG. 4A. Therefore, by turning on the reset transistor 431, the charge stored in the photodiode 401 and the charge stored in the diffusion capacitance FD 402 can be reset.

Another configuration will be further described with reference to FIG. 4C. FIG. 4C shows an exemplary configuration of a pixel having a global electronic shutter (GS) function that can perform batch transfer of all pixels. The configuration has one holding capacitance unit 403 and two transistors (a second reset transistor 432 and a GS transfer transistor 422) in addition to the configuration in FIG. 4B. For the sake of illustration, the position of the reset transistor 431 is different between FIGS. 4C and 4B.

The GS transfer transistor 422 transfers charge stored in the photodiode 401 to the holding capacitance unit 403 upon attaining an ON state. The FD transfer transistor 421 in an ON state transfers the charge in the holding capacitance unit 403 to the FD capacitance unit 402. The charge stored in the photodiode 401 can be reset by turning on the reset transistor 431.

Next, the flow of processing performed by the imaging element 100 according to the embodiment will be described with reference to FIG. 2. The following processing is performed on the basis of a control signal from a control circuit, but for the sake of simplicity of description, the control circuit and control signal will not be described. For the sake of simplicity of description, the flow of processing will be described for a single pixel.

Figure 2:
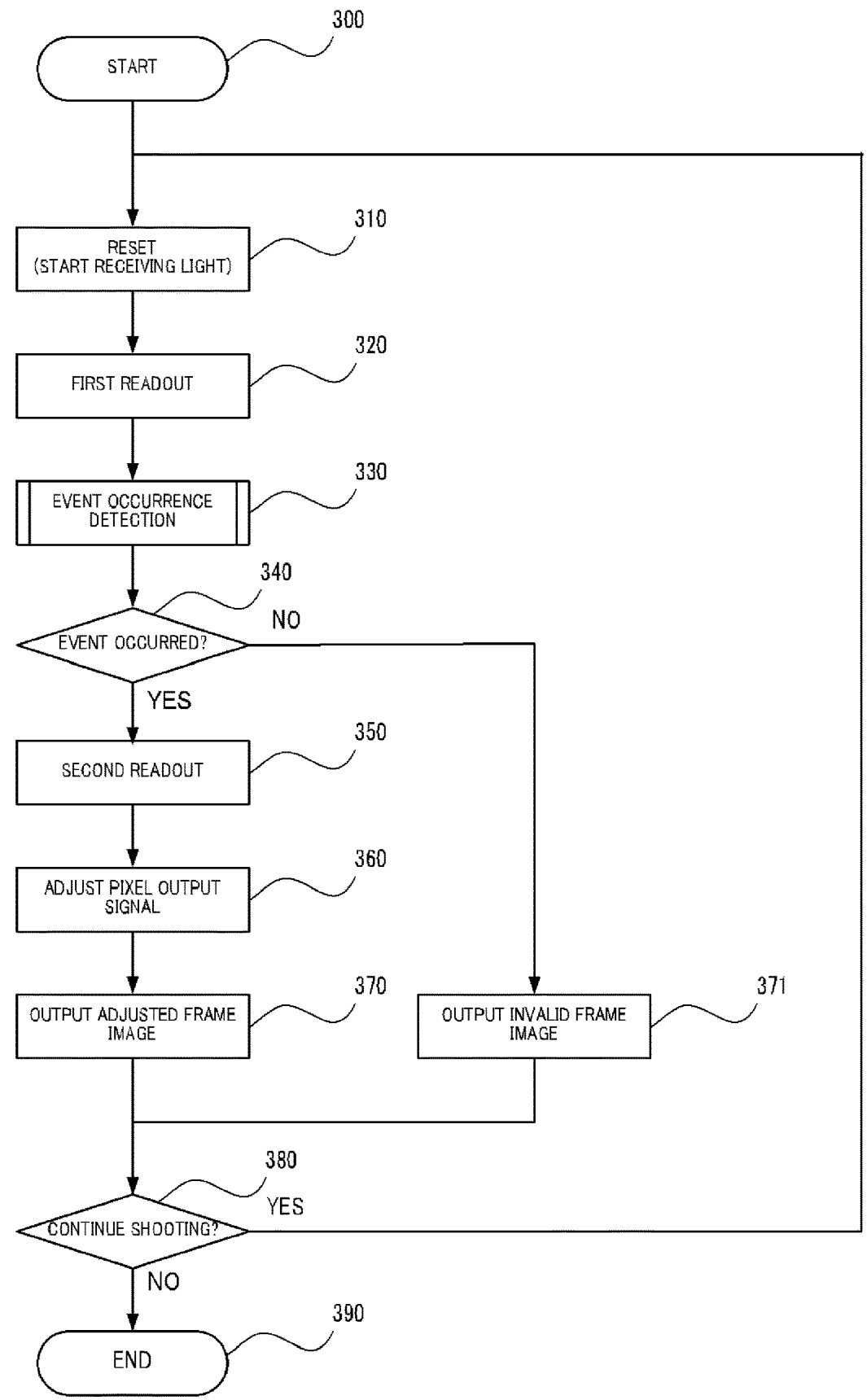
FIG. 2 is a flowchart for illustrating the processing by the imaging element according to the embodiment.

The processing in FIG. 2 starts by receiving an imaging instruction in step 300. In step 310, the reset unit 120 is driven to reset charge stored in the photoelectric conversion unit 110. Here, the photoelectric conversion unit 110 whose stored charge has been reset starts receiving light and begins to store charge. When a prescribed first time period T1 elapses after resetting the stored charge, pixel signal readout processing in step 320 is performed.

In step 320, a first pixel signal corresponding to the stored charge of the pixel is read out by the signal readout unit 130 (first readout processing). Herein, the period of time from the start of light reception until the pixel signal is read out is referred to as an exposure period. As soon as the reading out of the pixel output in step 320 is completed, the pixel starts receiving light again. In other words, according to the embodiment, the exposure is temporarily stopped for a very short period of time due to the first readout processing, but the exposure is continued during the first signal processing period, which will be described later. This means that image information to be acquired is not interrupted by the first signal processing, and image information with high real timeliness can be acquired.

In step 330, the signal processing unit 140 detects whether an event has occurred (first signal processing) on the basis of the pixel output signals read out at the same time in step 320. The signal processing unit 140 determines that an event has occurred when a moving subject in the images meets prescribed conditions. Examples of the prescribed conditions include the sudden stopping of the moving subject, the sudden movement of a stationary subject, and the movement of the subject different from the permitted or assumed movement.

In step 340, the signal processing unit 140 branches the processing depending on whether an event occurrence has been detected.

If an event is detected (Yes in step 340), the processing proceeds to step 350. In step 350, after a prescribed second time period T2 has elapsed from step 320, a second pixel signal corresponding to the stored charge of the pixel is read out by the signal readout unit 130 (second readout). In this second readout period, the signals exposed (stored) during the time period T2 from the first readout timing to the second readout timing are extracted. In step 360, the signal processing unit 140 corrects the second pixel signals (second signal processing). In step 370, the signal processing unit 140 outputs the corrected frame image.

Meanwhile, if no event is detected (No in step 340), the processing proceeds to step 371. In step 371, the second readout by the signal readout unit 130 and the second signal processing by the signal processing unit 140 are not performed. Furthermore, an invalid frame image is generated in the invalid frame image generation unit 151 of the signal output unit 150 and output externally. Here, the "invalid frame image" can be any information that is different from the second signal that would be obtained by performing the second readout and may be meaningless data in the simplest case. Examples of the meaningless data include an image in which all pixel values are filled with the zero value or any of other specific values, or an image with a specific pattern. As the manner of outputting invalid frame images, an entire image with a long update time (frame drops) or a coarse image acquired in the first readout may be output.

In step 380, it is determined whether the next frame is to be taken, and if the next frame is to be taken, the process returns to step 310, and if the next frame is not to be taken, the shooting ends (390).

When repeated shooting is performed, the processing of resetting the charge stored in the photoelectric conversion unit 110 by the reset unit 120 (step 310) is set at prescribed intervals in each pixel, the frequency of which is consistent with the frame rate. Meanwhile, the frequency at which image signals are output (steps 370 and 371) from the signal output unit 150 is also set to match the frame rate. Although the interval of resetting is the same among the pixels, the timing for resetting may be the same for all pixels or different between pixels or pixel rows.

Herein, the combination of the exposure and readout operations is referred to as imaging, the combination of the first exposure and the first readout are referred to as first imaging, and the combination of the second exposure and the second readout are referred to as second imaging. The first imaging can be referred to as imaging (exposure and readout) to obtain pixel information for event detection, and the second imaging can be referred to as imaging (exposure and readout) to obtain pixel information for output image generation. The group of pixel data obtained in the first imaging is called the first subframe pixel data, and the group of pixel data obtained in the second imaging is called the second subframe pixel data.

With reference to FIG. 3, the operating timing of the imaging element 100 according to the embodiment will be described. For simplicity of description, the timing chart will be described with respect to one pixel.

First, a photodiode charge reset signal 205 is generated, as shown in FIG. 3 at (a), to set the charge stored in the photoelectric conversion unit 110 to a constant state. The photodiode charge reset signal 205 is repeated at constant intervals and resets all pixels periodically at the same intervals as the frame period as described above.

During one cycle of reset, first imaging (first exposure and first readout) is performed in each pixel.

As shown in FIG. 3 at (b), the photoelectric conversion unit 110 of the pixel having undergone resetting receives light and starts to store charge (start of an exposure period). This exposure period continues until the next first readout signal is generated.

As shown in FIG. 3 at (c), when the first readout signal is input to the signal readout unit 130, the signal readout unit 130 reads out the stored charge from the photoelectric conversion unit 110. The readout signal is referred to as the first pixel signal. The operation at the time differs in detail depending on which of FIG. 4A to FIG. 4C the configuration of the imaging element 100 correspond to, but the fact remains that the charge signal is ultimately output as a voltage signal.

As shown in FIG. 3 at (d), the signal processing unit 140 performs event detection signal processing (first signal processing) on the first pixel signals read out in the first readout processing. Simultaneously with the start of the signal processing, as shown in FIG. 3 at (f), a second exposure period for the photoelectric conversion unit 110 starts, and the period continues until a second readout signal is generated (FIG. 3 at (g)).

FIG. 3 at (e) shows the result of the first signal processing and the signal depending on whether an event has been detected (Yes or No in step 340) is output. According to the present embodiment, a high-level signal is output if an event has been detected, and a low-level signal is output if no event has been detected.

Depending on the result of the first signal processing, the signal processing unit 140 determines whether to perform second readout processing in which charge stored by the second exposure is read out and the second signal processing based on the second pixel signal read out by the second readout processing. Specifically, the signal processing unit 140 determines that the second readout processing and the second signal processing are to be performed when an occurrence of a prescribed event is detected in the first signal processing (Yes in step 340). Meanwhile, if an occurrence of the prescribed event has not been detected in the first signal processing (No in step 340), the signal processing unit 140 determines that the second readout processing and the second signal processing are not to be performed. If the second readout processing and the second signal processing are not to be performed, the invalid frame image generation unit 151 of the signal output unit 150 generates an invalid image signal and outputs an invalid frame image signal (DUM DATA in FIG. 3 at (i)) from the signal output unit 150. The second readout processing and the second signal processing will be described below.

As shown in FIG. 3 at (g), when the occurrence of the prescribed event is detected (Yes in step 340) and the second readout signal is input to the signal readout unit 130, the signal readout unit 130 performs the second readout processing in which stored charge is read out from the photoelectric conversion unit 110. The read-out signal is referred to as the second pixel signal. As shown in FIG. 3 at (h), the signal processing unit 140 applies correction (adjustment) processing (second signal processing) to make the second pixel signal suitable as an image. In the second signal processing, an image signal for output from the imaging element 100 is generated on the basis of the second pixel signal. In FIG. 3 at (i), the adjusted image signal is output externally as a single image output from the signal output unit 150 (OUT DATA part in FIG. 3 at (h)).

As shown in FIG. 3, the period T in which the image signal is output coincides with the period T of the reset signal. As shown in FIG. 3, if the second reading has been completed, the reset signal can be generated even in the middle of the second signal processing and image output, since the pixel information itself has already been acquired. This reduces time wasted and minimizes the period T for outputting the image.

Examples of the prescribed events detected by the signal processing unit 140 according to the embodiment include a start of movement of a stationary subject, and a sudden stop of a moving subject.

An imaging element that detects a detection of a moving subject as an event can be used for monitoring for suspicious persons or intruders. In other words, only upon detecting a moving subject such as a suspicious person or intruder by the first readout processing and the first signal processing (event detection processing), the second readout processing and the second signal processing can be performed to output an image at the moment of the detection of the moving subject.

The imaging element that detects a sudden stop of a moving subject as an event can be used for traffic monitoring. In other words, for example, a sudden stop of a car due to a traffic accident can be detected and an image at the moment of detection can be output.

Event occurrence detection can be easily performed, for example, by storing pixel data acquired shortly before (a prescribed number of frames before) and detecting an event on the basis of any change between the pixel data and newly acquired pixel data. The event detection function according to the embodiment is not limited by the above function and method, and any other function and method can be used as long as the detection is based on information acquired by shooting. According to the embodiment, regardless of the content of the specific event detection function, an event can be automatically detected using only the imaging element 100 and an image at the moment of the event occurrence can be output in a timely manner. The occurrence of an event may be detected and an image only at that moment may be output. Alternatively, the second readout processing and the second signal processing may be performed continuously for the period of a prescribed number of frames when the occurrence of an event is detected and images therefor may be output. By continuing the image output for the period of the prescribed frames, the situation after the occurrence of the event can continue to be captured.

In FIG. 3, the reset is performed only once during one frame period in order to reset all pixels at the same time. However, the present disclosure is not limited in this way and a sub-reset may be performed once or more times during the period between the completion of the first readout and the start of exposure. Herein, the driving of the reset unit 120 before starting the first exposure is referred to as a reset (or a main reset), while the driving of the reset unit 120 before starting the second exposure is referred to as a sub-reset, and these two are considered to be clearly separated operations or separated kinds of processing.

The reset interval is the same for all pixels, but the timing for resetting may be the same for all pixels (global shutter) or may be different between pixel rows (rolling shutter).

As described above, according to the embodiment, the first signal is read out from the signal readout unit 130 and the first signal processing is performed in the signal processing unit 140 at intervals at which the periodic charge reset by the photoelectric conversion unit 110 is performed. On the basis of the result of the first signal processing, it is determined whether the second signal readout is to be performed. Therefore, according to the embodiment, an imaging element that can acquire an image upon the occurrence of an event without delay and without performing high-load signal processing or image transfer on the outside can be provided.

Note that in the description with reference to FIGS. 2 and 3, for the sake of simplicity of description, the description is only about a single pixel. When the imaging element has multiple pixels and includes as many signal transfer units 133 as the number of pixels, almost the same operation as described with reference to FIGS. 2 and 3 can be performed. However, in many cases, the signal transfer unit 133 is shared among multiple pixels, so that the readout is performed by shifting the timing little by little.

According to the described embodiment, the first readout processing, the first signal processing, the second readout processing and the second signal processing are performed within one cycle of periodic reset, though not limited to this. For example, the first readout processing, the first signal processing and the second readout processing may be performed within one cycle of reset, while the second signal processing may be performed in the next or subsequent period.

According to the described embodiment, the signal processing unit 140 does not perform the second readout processing or the second signal processing depending on the received result (Yes or No in step 340) of the event detection of the signal processing (first signal processing). However, the present disclosure is not limited to this. Even when the result of detection is No in step 340, the second readout processing or the second signal processing may still be performed, which requires extra power consumption, provided that an increase in the power consumption is not a practical concern. In this case, the signal output unit 150 has an invalid frame image generation unit 151 and can therefore operate similarly to the present disclosure.

Figure 5:
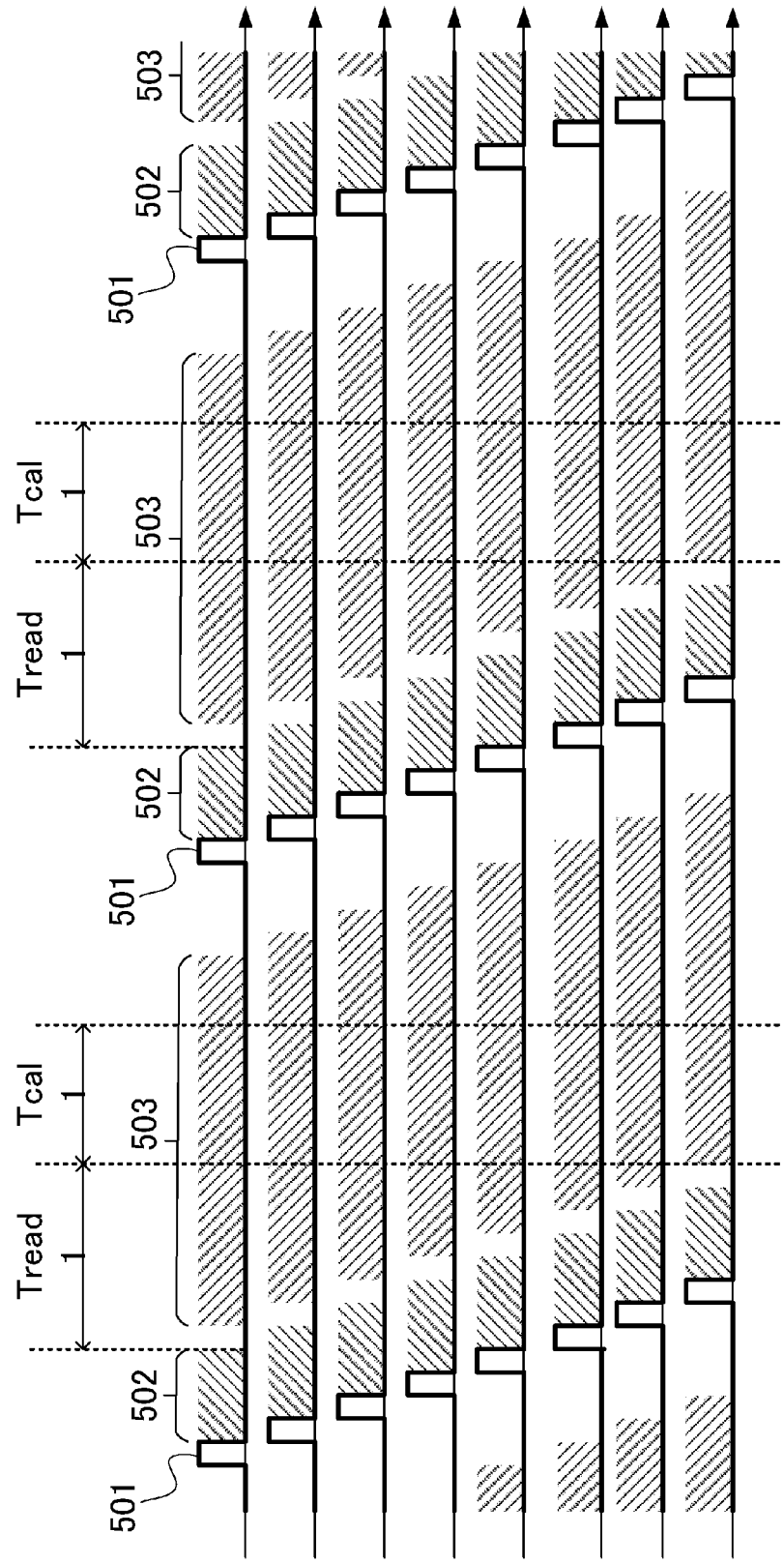
FIG. 5 is a timing chart for illustrating the processing by the imaging element according to the embodiment.

With the circuit configuration described with reference to FIG. 4A or FIG. 4B, the timing can be illustrated schematically as in FIG. 5. FIG. 5 shows a reset signal (main) 501, a first exposure period 502, and a second exposure period 503. In FIG. 5, only the timings for eight pixels are shown schematically to simplify the drawing. Also, although only 501, 502 and 503 are shown due to space limitations in the drawing, the other signals shown in FIG. 3 similarly operate at slightly shifted timings. Here, Tread1 is the first readout period and Tcal1 represents the period required for the first signal processing. In this way, the degree of effect of the first readout on exposure can be minimized, and the exposure period can be extended. In addition, since the second exposure is continued during the period of the first signal processing, there is no need to stop the exposure. With the circuit configuration described with reference to FIG. 4C, the reset timing, i.e., the exposure timing, in all pixels can be the same.

Figure 1C:
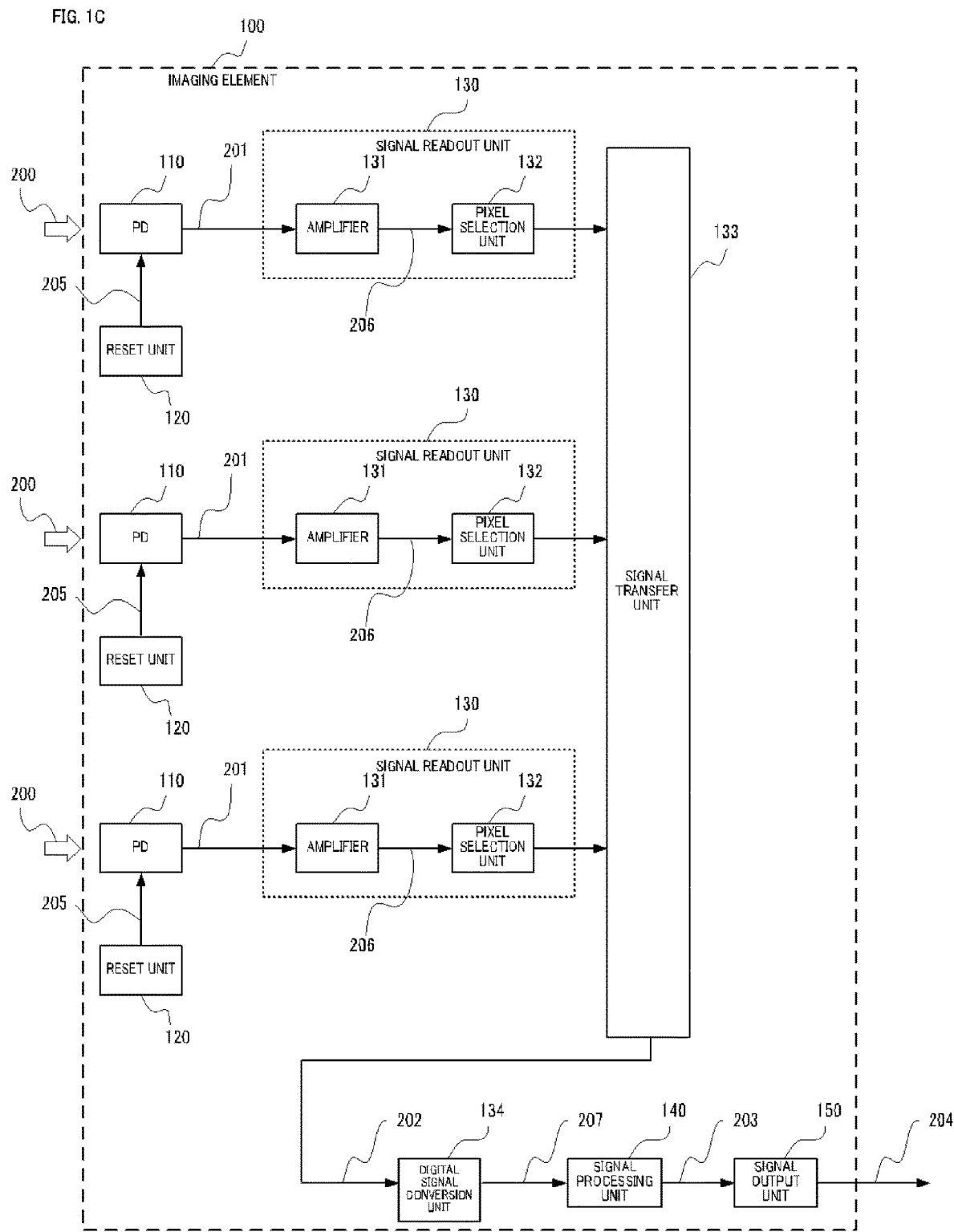

In FIG. 1B, the signal transfer unit 133 is directly connected to the signal processing unit 140, but as shown in FIG. 1C, a digital signal conversion unit 134 may be provided between the signal transfer unit 133 and the signal processing unit 140. The digital signal conversion unit 134 can convert an analogue output signal from the amplifier 131 of each pixel into a digital signal 207. This allows digital signals to be directly input to the signal processing unit 140, which facilitates signal processing using the digital signals.

Although the signal processing unit 140 and the signal output unit 150 are provided inside the imaging element 100 according to the embodiment, the signal processing unit 140 and the signal output unit 150 can be provided outside the imaging element 100.

As shown in FIG. 1D, the signal readout unit 130 of each pixel includes the digital signal conversion unit 134 that digitizes the output signal of the amplifier 131 and transmits the digital signal 207 to the signal transfer unit 133.

Figure 1E:
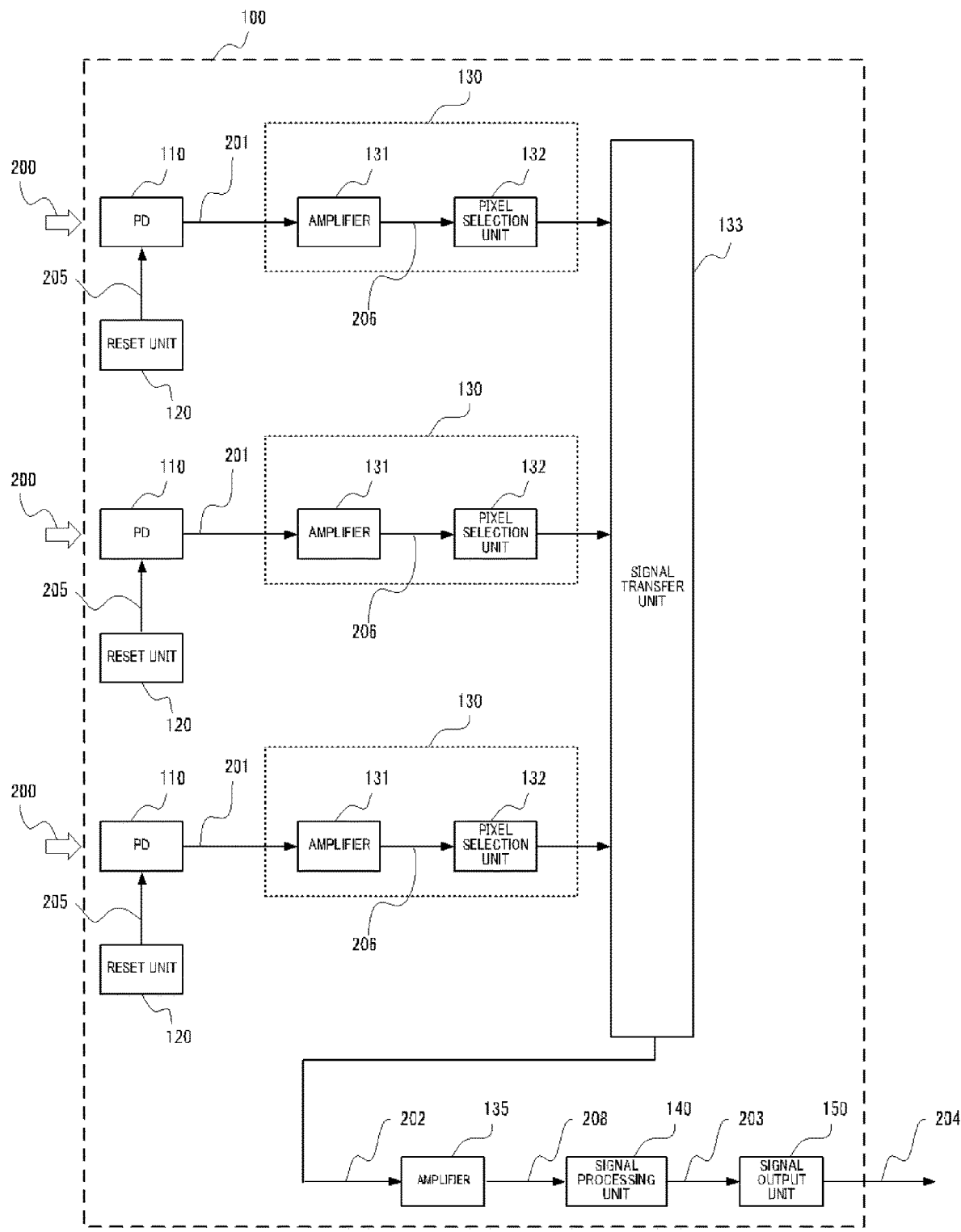

Furthermore, as shown in FIG. 1E, an amplifying amplifier 135 can be arranged between the signal transfer unit 133 and the signal processing unit 140 to transfer the pixel signal as an amplified signal 208, which can similarly be used to improve the SN ratio.

Second Embodiment

A second embodiment of the disclosure is substantially identical to the first embodiment with the difference being that a pixel signal (image information) obtained in the first imaging is also used to output an image from the signal output unit 150. Hereinafter, the aspects different from the first embodiment will be mainly described.

Figure 6:
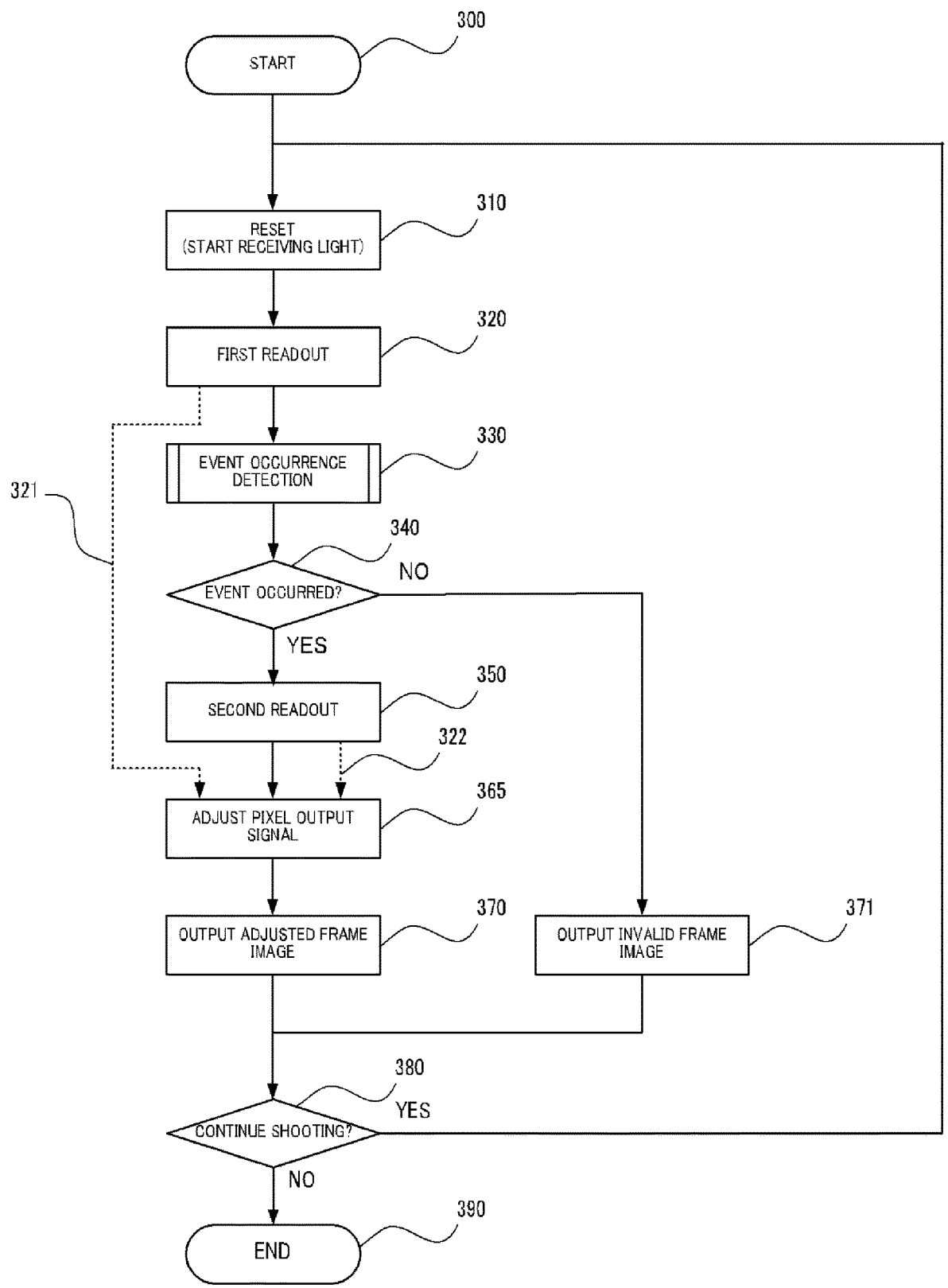
FIG. 6 is a flowchart for illustrating the processing by an imaging element according to a second embodiment.

FIG. 6 is a flowchart for illustrating the operation according to the embodiment. The operation of the embodiment is similar to the operation according to the first embodiment (FIG. 2), except that the content of step 360 is different. In FIG. 6, the dotted line 321 indicates the flow of a pixel signal obtained by the first imaging and the dotted line 322 indicates the flow of a pixel signal obtained by the second imaging.

According to the embodiment, in pixel signal adjustment processing (step 365) after the second readout processing (step 350), using the pixel signal from the first imaging for event determination, in addition to the pixel signal 322 from the second imaging, an image is output from the signal output unit 150. Specifically, as shown in FIG. 6, in step 365, the signal processing unit 140 generates a frame image on the basis of the pixel signal 321 from the first readout (step 320) and the pixel signal 322 from the second readout (step 350). The frame image is generated, for example, by combining the pixel signal 321 and the pixel signal 322. In step 370, the signal processing unit 140 outputs the generated frame image.

According to the embodiment, the pixel signal obtained by the first readout used for event detection is also used to generate the frame image, so that the total exposure period in shooting is hardly reduced even if event detection is performed. Therefore, according to the embodiment, the advantageous effect of the first embodiment can be obtained and a frame image with a higher image quality can be output.

Third Embodiment

A third embodiment of the disclosure is substantially identical to the first embodiment with the difference being that the first readout is performed only for some of the pixels. The embodiment may be implemented in combination with the second embodiment.

According to the embodiment, a plurality of pixels 600 are divided into a first pixel group and a second pixel group, and the first imaging is performed only with the first pixel group. Hereafter, the pixels belonging to the first pixel group will also be referred to as the first pixels and the pixels belonging to the second pixel group will also be referred to as the second pixels.

Figure 7A:
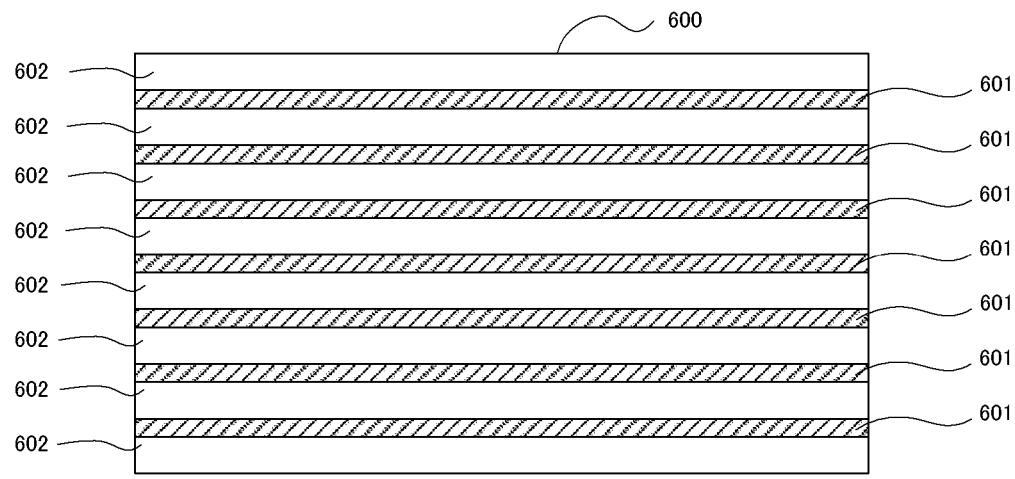
FIGS. 7A to 7C are schematic views for illustrating an imaging element according to a third embodiment.

FIG. 7A is a schematic view of an exemplary configuration of the pixels according to the embodiment. As shown in FIG. 7A, the first pixel group 601 and the second pixel group 602 are arranged in rows (horizontal direction) in the imaging element. In other words, the first pixels and the second pixels are arranged every other row, and the first pixels and the second pixels are arranged alternately when viewed in the column direction.

The operation according to the embodiment is basically the same as the first embodiment (FIG. 2). However, the first readout processing in step 320 is performed only from the pixels belonging to the first pixel group 601, and no readout is performed from the pixels belonging to the second pixel group 602. The event occurrence detection processing in step 330 is based on pixel signals obtained from the first pixel group 601. The processing from step 350 onwards after detection of an event occurrence is performed on both the first pixel group 601 and the second pixel group 602.

In this way, according to the embodiment, only some of the pixel signals are read for event detection, rather than reading out all the pixel signals, so that the pixel signal transfer time can be shortened. Therefore, the reduction in exposure period during the second imaging due to event detection can be minimized. In addition, as the number of pixels used in the event detection processing (first signal processing) is limited, the load on signal processing can be minimized, which allows the size and power consumption to be reduced.

Furthermore, as the pixels belonging to the first pixel group 601 are scattered throughout the screen, event detection can be performed over the entire screen. Here, according to the embodiment, the event detection can be widely applied, as in many cases, sufficient information can be obtained even with pixel signals that have been thinned out. The number of the pixels belonging to the first pixel group 601 is desirably smaller than the number of the pixels belonging to the second pixel group 602. Considering the processing load and the detection efficiency, the ratio of the number of the pixels belonging to the first pixel group 601 to the total number of the pixels is desirably about several tens of percent to several percent.

Although additional control lines are required to perform the first imaging and the second imaging for the first pixels, the number of the control lines relative to the number of the first pixels can be minimized because the entire row is set as the first pixels.

As described above, the imaging element according to the embodiment allows the signal processing and transfer processing loads to be reduced by performing the first readout processing and the first signal processing only on the first pixel group, so that events can be detected efficiently.

Figure 7B:
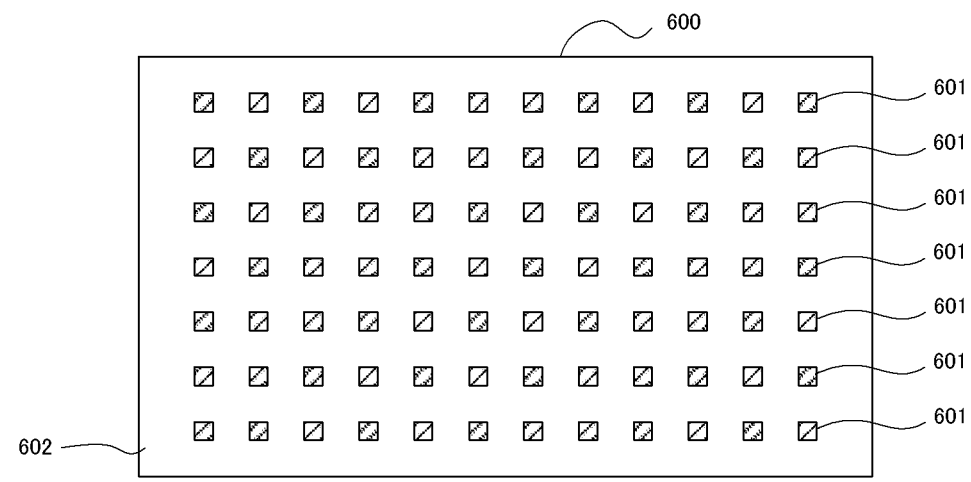
Figure 7C:
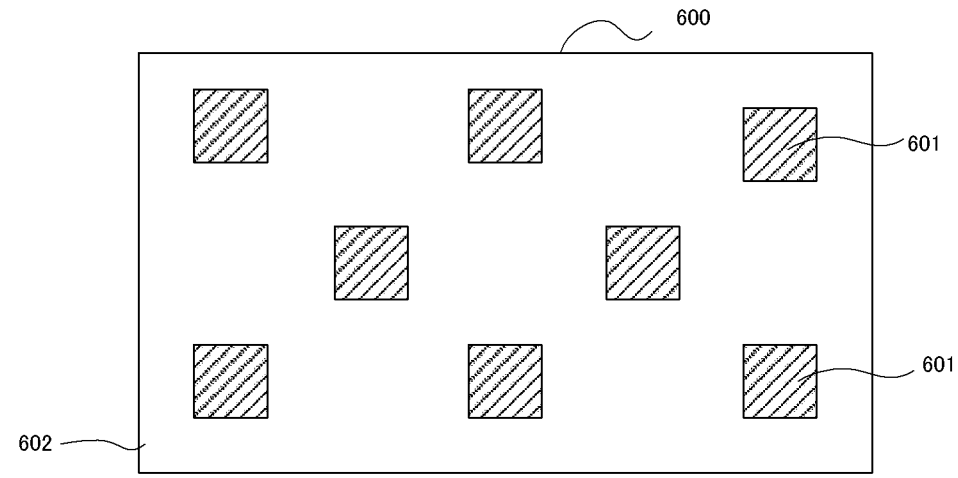

The pixel arrangement in FIG. 7A is only an example. For example, as shown in FIG. 7B, the pixels of the first pixel group 601 can be arranged in a dot-like pattern. This increases the number of pixel control lines, but the number of pixel data to be read out in the first readout processing can be further reduced. This allows the imaging device to operate with reduced power consumption and detect events in a shorter time. In FIG. 7B, the first pixels are separated and arranged one by one in a dot-like pattern, but a plurality of first pixels may be arranged together in a tiled pattern. The first pixels need not be arranged in a grid pattern and can be arranged in any positions. In FIG. 7C, the first pixels are arranged in a tiled pattern and at non-periodic intervals. The pixel arrangement according to the embodiment is not limited to the above examples and may be arbitrary.

Fourth Embodiment

A fourth embodiment of the disclosure is substantially identical to the third embodiment with the difference being that the second readout processing on the second pixel group is different. The aspects different from the third embodiment will be mainly described below.

An imaging element according to the embodiment includes a first pixel group and a second pixel group similarly to the third embodiment. According to the present embodiment, during the period in which the pixels included in the first pixel group undergo the first imaging, the pixels included in the second pixel group start exposure in the second imaging.

Figure 8:
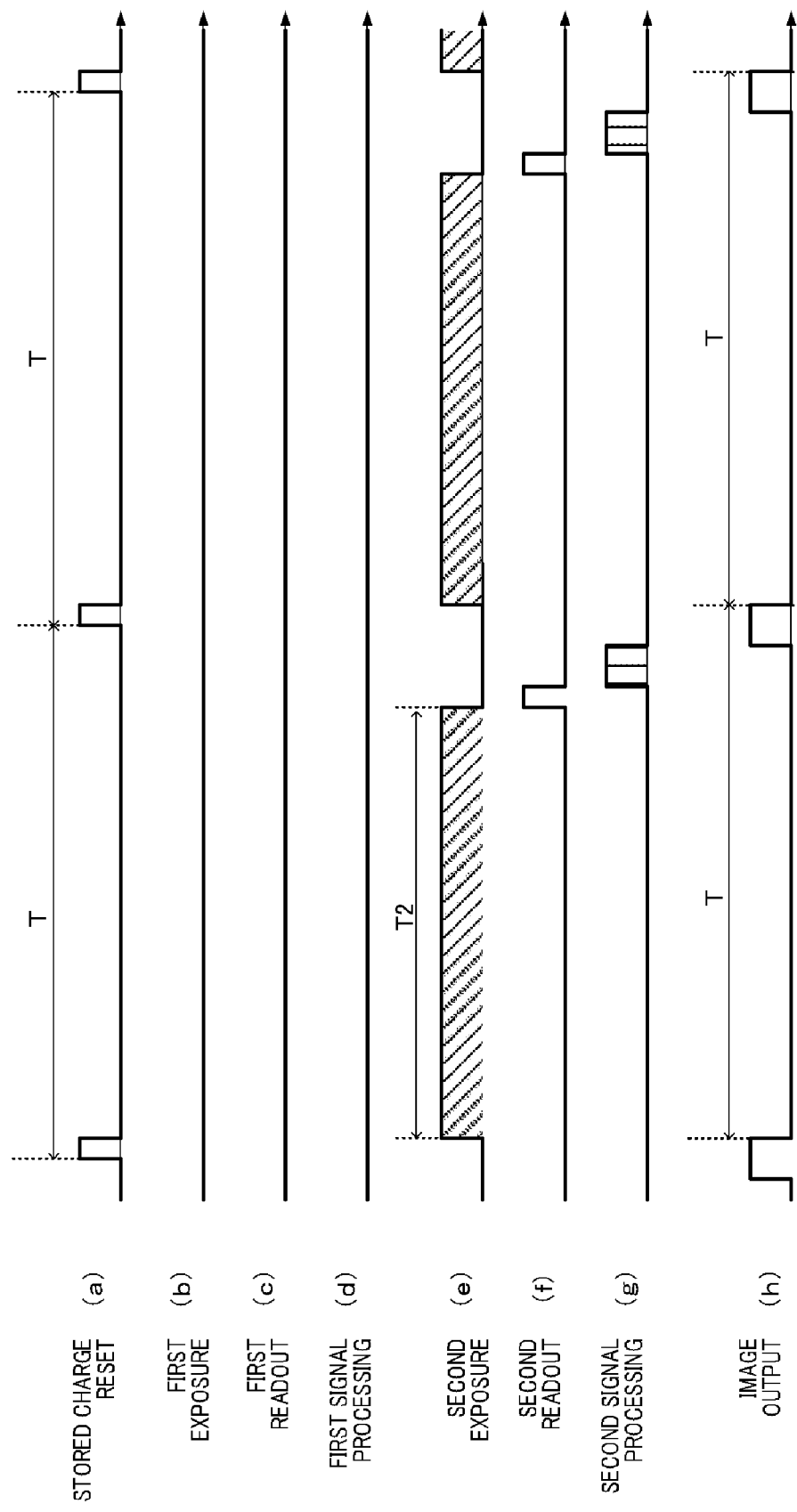
FIG. 8 is a chart for illustrating the timing of processing by an imaging element according to a fourth embodiment.

With reference to FIG. 8, the operation timing for the second pixel group will be described. The operation timing for the pixels belonging to the first pixel group is the same as that described with reference to FIG. 3 and will not be described.

The operation of the second pixel group (FIG. 8) is different from the operation of the first pixel group (FIG. 3) in that, as shown in FIG. 8 at (b) to (d), there is no first exposure period, no first readout and no first signal processing for the second pixel group. According to the embodiment, the start timing for the first exposure of the first pixel group and the start timing for the second exposure of the second pixel group are equal, and the exposure period of the first exposure of the first pixel group and the exposure period of the second exposure of the second pixel group overlap in time. The advantageous effects of the present embodiment can be provided in the third embodiment by allowing the exposure periods to overlap and setting the exposure period of the second exposure of the second pixel group to be longer even when the exposure start timings do not match.

According to the embodiment, the pixels belonging to the second pixel group can use the long period between the reset signal of the stored charge and the second readout signal as the exposure period, as shown in FIG. 8 at (e). As a result, for the second pixel group, there is no need to shorten the exposure period during imaging even when event detection is performed, and the image quality of the frame image with the pixels in the second pixel group will not be affected by the event detection.

The imaging element according to the embodiment can perform event detection with real timeliness while reducing deterioration in the image quality of the acquired image.

Fifth Embodiment

A fifth embodiment of the disclosure is substantially identical to the fourth embodiment except that the content of the frame image generation processing is different. The aspects different from the fourth embodiment will be mainly described below.

According to the embodiment, pixel output data is generated by combining (correcting) pixel signals from the first pixels obtained during the second imaging and pixel signals from the second pixels obtained during the second imaging on the basis of the ratio of the lengths of the exposure periods.

Figure 9A:
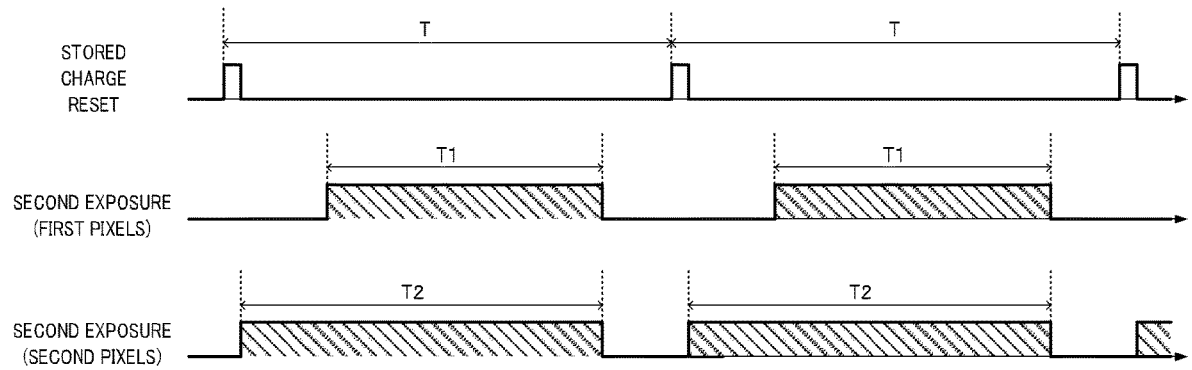
FIGS. 9A and 9B schematically illustrate an imaging element according to a fifth embodiment.

With reference to FIG. 9A, the embodiment will be described. According to the embodiment, similarly to the fourth embodiment, the pixels in the second pixel group undergoes exposure in the second imaging during the period in which the pixels in the first pixel group perform the first imaging. Therefore, as shown in FIG. 9A, the length T1 of the exposure period in the second imaging of the pixels included in the first pixel group is different from the length T2 of the exposure period in the second imaging of the pixels included in the second pixel group. Specifically, the pixels included in the first pixel group have shorter exposure period during the second imaging than the pixels included in the first pixel group since the first imaging and the first signal processing are additionally performed. Therefore, when the acquired pixel signals are converted directly into a frame image, the pixels included in the first image group become darker than the pixels included in the second pixel group.

In view of the problem, the signal processing unit 140 according to the embodiment performs the following processing as the second signal processing. First, the signal processing unit 140 adjusts the respective pixel values of the second pixel signals of the first pixel group by multiplying the values by the ratio of the second exposure period between the second pixel group and the first pixel group. Then, the signal processing unit 140 generates an image signal for output on the basis of the second pixel signals in the first pixel group and the second pixel signals in the second pixel group after adjustment.

Figure 9B:
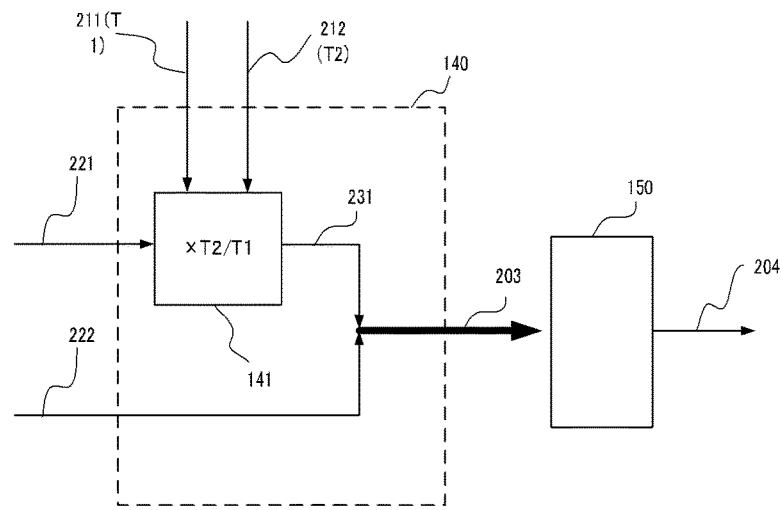

FIG. 9B illustrates the frame image generation processing by the signal processing unit 140 according to the embodiment. According to the embodiment, the signal processing unit 140 has a correction unit 141 that applies a prescribed gain to the second pixel signal 221 by the second imaging of the first pixel to increase the pixel value. The prescribed gain is the ratio (T2/T1) of information 211 about the time length T1 of the exposure period of the first pixel in the second imaging and the information 212 about the time length T2 of the exposure period of the second pixel in the second imaging. By multiplying the pixel signal 221 of the first pixel by the gain T2/T1, the corrected pixel signal 231 will have the same brightness as the pixel signal 222. The signal processing unit 140 combines the corrected pixel signal 231 by the correction unit 141 and the pixel signal 222 by the second imaging of the second pixel, and outputs a frame image 203.

In this way, the brightness of the first and second pixels can be made almost uniform, and variations in the brightness of the frame image can be reduced to a minimum. Although multiplying the pixel signal of the first pixel by the gain also increases noise, the number of the first pixels can be smaller than the number of the second pixels, so that the image quality degradation caused by the correction of the pixel signal of the first pixel can be minimized.

As described above, the imaging element according to the embodiment can perform event detection with real-timeliness and minimized variations in the brightness in the image quality of acquired images.

Sixth Embodiment

A sixth embodiment is substantially identical to the fourth embodiment with the difference being that the pixel signal in the first imaging of the first pixel used for event detection is also used for frame image generation. The embodiment may be implemented in combination with the fifth embodiment.

FIG. 10 is a schematic diagram of the signal processing unit 140 according to the embodiment. The signal processing unit 140 generates a frame image 203 using the first pixel signal 220 and the second pixel signal 221 from the first pixel group and the second pixel signal 222 from the second pixel group. The first pixel signal 220 obtained by the first imaging of the first pixel is used for event detection and then temporarily stored in the internal memory of the signal processing unit 140. The first pixel signal 220 is then combined with the second pixel signal 221 from the second imaging of the first pixel by an addition unit 142. The combined signal is referred to as the pixel signal 232. The signal processing unit 140 adds the pixel signal 232 with the pixel signal 222 from the second imaging of the second pixel to generate the frame image 203.

According to the embodiment, the exposure period of the pixel signal used to generate the frame image for the first pixel is the sum of the first exposure period T0 (in FIG. 3 at (b)) and the second exposure period T1 (in FIG. 3 at (e)). The resultant exposure period is almost the same as the exposure period T2 in the second imaging (FIG. 8 at (e)) of the second pixel. Therefore, the difference in brightness between the first and second pixels can be reduced, and a high-quality frame image can be generated. In addition, since the pixel signal magnification is not changed as in the fifth embodiment, there is no deterioration in the signal-to-noise ratio (SN ratio), and an image with a higher quality can be output.

Therefore, the imaging element according to the embodiment can perform real-timeliness event detection with minimized deterioration in the image quality of the acquired image.

Although in the description of the embodiment the pixel signals 232 and 222 are simply combined, the disclosure is not limited by this. If there is no problem in actual use, the configuration described above may be used, and if a higher pixel quality is desired, a configuration combined with the configuration according to the fifth embodiment may be used. Specifically, the signal processing unit 140 may increase the pixel signal 232, which is the sum of the pixel signal 220 and the pixel signal 221, by the ratio between the sum of the first and second exposure periods (T0+T1) of the first pixel and the second exposure period of the second pixel (T2). In this way, the difference in the exposure period for the first readout for event detection can be corrected, and a higher quality frame image can be output.

Seventh Embodiment

A seventh embodiment is substantially identical to the first embodiment with the difference being that the first imaging (exposure and readout) is repeated multiple times within one cycle. The embodiment may be implemented in combination with any of the second to sixth embodiments.

FIG. 11 illustrates the operation of the imaging element according to the embodiment. As shown in FIG. 11, according to the embodiment, the first exposure and the first readout processing are repeated multiple times during the first imaging period within one cycle. In FIG. 11, three exposures and three readouts are performed during the first imaging period, but the number is not limited as long as it is at least two. By performing multiple exposures and readouts during the first imaging period, event detection processing (first signal processing) can be performed on the basis of multiple first pixel signals, so that the moving state and direction of a subject can be determined more accurately. Specifically, the signal processing unit 140 can determine high-speed movement within a single frame and can detect events more accurately.

The imaging element according to the embodiment can perform event detection more accurately without performing the signal processing and image transfer with a high load on the outside, and an imaging device that can acquire images upon the occurrence of an event without delay can be provided.

Eighth Embodiment

An eighth embodiment is substantially identical to the first to seventh embodiments with the difference being that the imaging element is configured as a stacked type sensor. The imaging element according to the embodiment is configured as a stacked type sensor in which a substrate with a photoelectric conversion element (first substrate) and a digital substrate (second substrate) are stacked on each other in the substrate thickness-wise direction.

Figure 12:
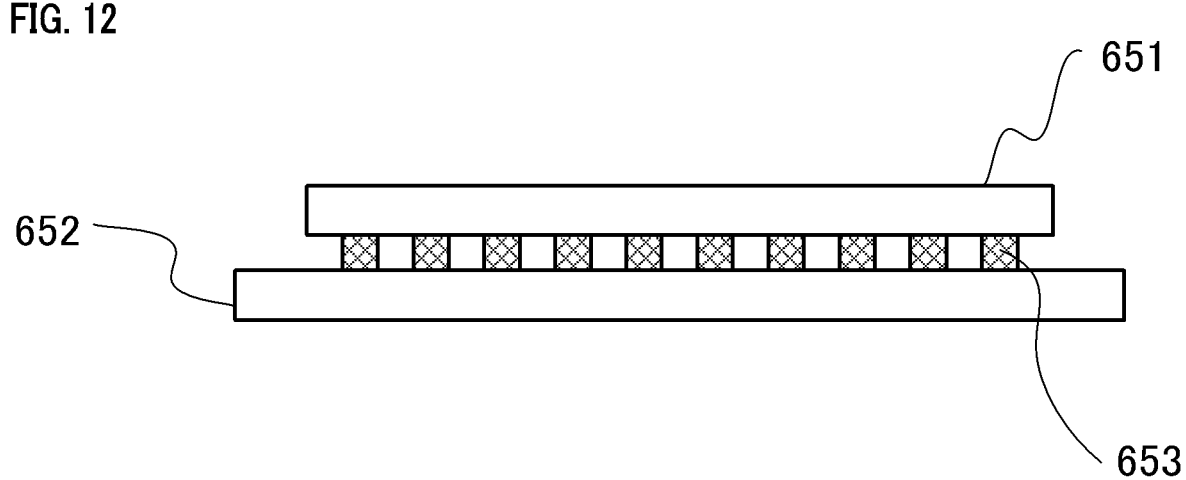
FIG. 12 is a schematic view for illustrating an imaging element according to an eighth embodiment.

FIG. 12 illustrates the configuration of the imaging element according to the embodiment. The imaging element according to the embodiment includes a substrate 651 having a photoelectric conversion unit 110 and a digital substrate 652 stacked on each other in the thickness-wise direction of the substrates and connected by a substrate bonding member 653. The substrate 651 having the photoelectric conversion element has thereon circuits close to pixels such as a photoelectric conversion unit 110, a signal readout unit 130, a pixel selection unit 132, a signal transfer unit 133. Meanwhile, the digital substrate 652 has thereon for example a digital signal conversion unit 134, a signal processing unit 140, and a memory. By connecting these two substrates vertically, signals from pixels can be efficiently transferred to the digital section, so that the imaging element can have a smaller size and higher performance. The substrate bonding member 653 can be easily realized by using any of common semiconductor fabrication processes such as solder bumps or direct bonding between substrates.

According to the embodiment, since a stacked-type sensor is used, signal processing on pixel signals from a large number of pixels can be performed at high speed, so that event detection can be more accurate and faster.

Ninth Embodiment

According to a ninth embodiment, an imaging device having any of the imaging elements according to the first to eighth embodiments is provided.

Figure 13A:
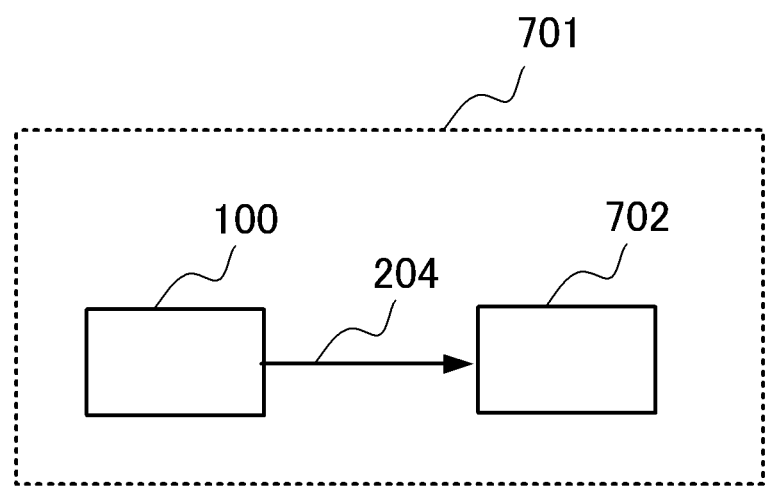
FIGS. 13A and 13B are schematic diagrams for illustrating an imaging device according to ninth and tenth embodiments.

FIG. 13A is a schematic diagram of the imaging device 701 according to the embodiment. The imaging device 701 includes an imaging element 100 according to any of the first through eighth embodiments and a recording device 702. The imaging element 100 outputs an image output 204 to the recording device 702. The image output 204 is a valid frame image when an event has occurred and an invalid frame image when no event has occurred. The recording device 702 records an input valid frame image and does not record an input invalid frame image.

In this way, the imaging device 701 having the imaging element 100 can monitor events about a subject and can automatically record the moment when an event occurs.

Although in the above-described example, only the moment of the occurrence of an event is recorded, the device can be similarly used for recording for a certain period of time after the occurrence of an event. In addition, instead of or in addition to recording images at the time of event detection in the recording device 702, the imaging device 701 may also have a function to transmit the images to the outside for example over a network.

Tenth Embodiment

According to a tenth embodiment, a monitoring device having any of the imaging elements according to the first to eighth embodiments is provided.

Figure 13B:
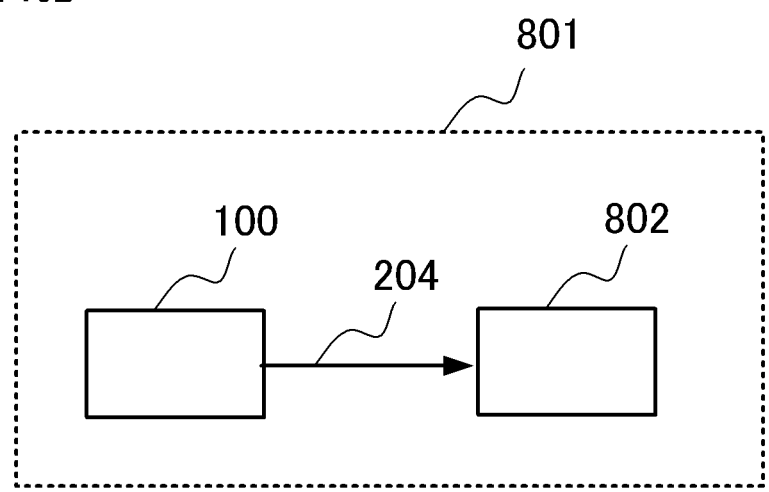

FIG. 13B is a schematic diagram of the monitoring device 800 according to the embodiment. The monitoring device 800 includes an imaging element 100 according to any of the first to eighth embodiments and an event notification unit 802. The imaging element 100 outputs an image output 204 to the event notification unit 802. The image output 204 is a valid frame image when an event has occurred and an invalid frame image when no event has occurred. The event notification unit 802 notifies that an event has occurred when a valid frame image is input and does makes no notification when an invalid frame image is input. The specific manner of notification is not particularly limited. For example, the event notification unit 802 may notify an external device that an event has occurred through communication or may generate sound or light to notify surrounding people that an event has occurred.

For example, the monitoring device 800 can be installed to photograph a location such as an intersection and can be configured to detect the occurrence of a traffic accident as an event. The monitoring device 800 can be configured to automatically notify the police and report the situation to the traffic information center upon detecting the occurrence of a traffic accident. The monitoring device 800 can also deliver images directly to vehicles in the vicinity. This allows drivers to judge the situation at the scene themselves on the basis of the images and take action to avoid for example danger or traffic congestion.

The monitoring device 800 can also be used for a hazard prevention system at an intersection with poor visibility. The monitoring device 800 may be configured to detect the approach of a car or pedestrian as an event and warn the surrounding area of the approach.

OTHER EMBODIMENTS

The disclosure can be carried out also by supplying a program that realizes at least one of the functions according to the embodiments described above to a system or device over a network or on a storage medium and causing at least one processor in the computer of the system or device to read and execute the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

What is claimed is:

1. An imaging element having a plurality of pixels, wherein
the plurality of pixels have stored charge reset periodically,
at least in some of the plurality of pixels,
first readout processing in which stored charge by first exposure is read out is performed,
first signal processing based on a first pixel signal read out by the first readout processing is performed,
whether to perform second readout processing in which stored charge by second exposure is read out and second signal processing based on a second pixel signal read out by the second readout processing is determined, in response to a result of the first signal processing, and
the first readout processing, the first signal processing, and the second readout processing are performed within one cycle of reset which is performed periodically.

2. The imaging element according to claim 1, wherein the first readout processing, the first signal processing, the second readout processing, and the second signal processing are performed within one cycle of reset which is performed periodically.

3. The imaging element according to claim 1, wherein in the second signal processing, an image signal for output is generated on the basis of the first pixel signal in addition to the second pixel signal.

4. The imaging element according to claim 3, wherein
the plurality of pixels include a first pixel group and a second pixel group,
the first readout processing is performed on pixels that belong to the first pixel group, and
the second readout processing is performed on pixels that belong to the first pixel group and pixels that belong to the second pixel group.

5. The imaging element according to claim 4, wherein the exposure period of the first exposure for the pixels that belong to the first pixel group and the exposure period of the second exposure for the pixels that belong to the second pixel group overlap in time.

6. The imaging element according to claim 5, wherein timing for starting the first exposure for the pixels that belong to the first pixel group is equal to timing for starting the second exposure for the pixels that belong to the second pixel group.

7. The imaging element according to claim 4, wherein in the second signal processing, an image signal for output is generated on the basis of the second pixel signal.

8. The imaging element according to claim 7, wherein in the second signal processing, the pixel values of the second pixel signals of the pixels that belong to the first pixel group are adjusted by multiplying the pixel values by a ratio between the exposure period of the second exposure of the pixels that belong to the second pixel group and the exposure period of the second exposure of the pixels that belong to the first pixel group, and the image signal for output is generated using the second pixel signals after the adjustment.

9. The imaging element according to claim 8, wherein in the second signal processing, the pixel signal for output is generated using the first pixel signals and the second pixel signals of the pixels that belong to the first pixel group and the second pixel signals of the pixels that belong to the second pixel group.

10. The imaging element according to claim 9, wherein in the second signal processing, the pixel values as the sum of the first signals and the sum of the second pixel signals of the pixels that belong to the first pixel group are adjusted by multiplying the pixel values by a ratio between the exposure period of the second exposure of the pixels that belong to the second pixel group and the total exposure period of the first exposure and the second exposure of the pixels that belong to the first pixel group, and the image signal for output is generated using the image signal after the adjustment.

11. The imaging element according to claim 4, wherein the number of the pixels that belong to the first pixel group is smaller than the number of the pixels that belong to the second pixel group.

12. The imaging element according to claim 1, wherein the first exposure and the first readout processing are performed a plurality of times within one cycle of the reset.

13. The imaging element according to claim 1, wherein the first signal processing is processing in which an occurrence of a prescribed event is detected, and the second readout processing and the second signal processing are performed in a case where the occurrence of the prescribed event is detected.

14. The imaging element according to claim 13, wherein the second readout processing and the second signal processing continue to be performed for a prescribed period in a case where the occurrence of the prescribed event is detected.

15. The imaging element according to claim 14, wherein the prescribed event includes at least one of a start of movement of a stationary subject and a stop of movement of a moving subject.

16. The imaging element according to claim 13, wherein an invalid image signal is output without performing the second readout processing and the second signal processing when no occurrence of the prescribed event is detected in the first signal processing.

17. The imaging element according to claim 16, wherein the invalid image signal represents an image filled with particular values or an image having a particular pattern.

18. The imaging element according to claim 1, comprising a first substrate having a photoelectric conversion unit and a readout unit configured to read out charge stored in the photoelectric conversion unit;
a second substrate having a signal processing unit configured to perform the first signal processing and the second signal processing, wherein
the first substrate and the second substrate are stacked on each other in a substrate thickness-wise direction.

19. An imaging device comprising:
an imaging element according to claim 1; and
a recording device, wherein
the first signal processing is processing in which an occurrence of a prescribed event is detected, and
the recording device records an image signal generated by the second signal processing in a case where the occurrence of the prescribed event is detected.

20. A monitoring device comprising:
an imaging element according to claim 1; and
a notification unit, wherein
the first signal processing is the processing of detecting an occurrence of a prescribed event, and
the notification unit notifies the occurrence of the prescribed event in a case where the occurrence of the prescribed event is detected.

21. The monitoring device according to claim 20, wherein the notification unit also notifies an image signal generated by the second signal processing when notifying the occurrence of the prescribed event.

22. A method for controlling an imaging element comprising a plurality of pixels each including a photoelectric conversion unit, a readout unit configured to read out charge stored in the photoelectric conversion unit, a reset unit configured to reset the photoelectric conversion unit, and a signal processing unit configured to perform signal processing on a pixel signal each output from the plurality of the pixels,
the method comprising the steps of:
resetting the photoelectric conversion unit periodically in the plurality of pixels;
performing first readout processing in which charge stored by first exposure is read out;
performing first signal processing on the basis of a first pixel signal read out by the first readout processing;
determining, in response to a result of the first signal processing, whether to perform second readout processing in which charge stored by second exposure is read out and second signal processing based on a second pixel signal read out by the second readout processing, wherein
the first readout processing, the first signal processing, and the second readout processing are performed within one cycle of reset performed periodically.

* * * * *